United States Patent [19]
Wisner et al.

[11] 3,978,393
[45] Aug. 31, 1976

[54] HIGH EFFICIENCY SWITCHING REGULATOR

[75] Inventors: Daniel A. Wisner, Milan; Andrew S. Mihalik, Jr., Northville, both of Mich.

[73] Assignee: Burroughs Corporation, Detroit, Mich.

[22] Filed: Apr. 21, 1975

[21] Appl. No.: 569,999

[52] U.S. Cl. .................................. 323/17; 321/2; 323/23; 323/DIG. 1
[51] Int. Cl.² ........................................... G05F 1/50
[58] Field of Search ............... 323/17, 20, 23, 25, 323/DIG. 1; 321/2; 307/317 A

[56] References Cited
UNITED STATES PATENTS

| | | | |
|---|---|---|---|
| 3,521,150 | 7/1970 | Bates | 323/25 |
| 3,577,065 | 5/1971 | Putzrath et al. | 323/DIG. 1 |
| 3,623,925 | 11/1971 | Jenkins et al. | 307/317 A |
| 3,733,519 | 5/1973 | Griffey | 323/DIG. 1 |
| 3,796,919 | 3/1974 | Johnson | 323/20 |
| 3,803,471 | 4/1974 | Price et al. | 323/DIG. 1 |
| 3,824,450 | 7/1974 | Johnson et al. | 323/DIG. 1 |
| 3,849,675 | 11/1974 | Waaben | 307/317 A |

OTHER PUBLICATIONS

*IBM Tech. Disc. Bulletin*, vol. 17, No. 9, Feb. 1975; pp. 2666, 2667 "Analog–Digital Transistor Switching Reg. Controller" by Calvo et al.

*Primary Examiner*—Gerald Goldberg
*Attorney, Agent, or Firm*—Lynn L. Augspurger; Kevin R. Peterson; Edwin W. Uren

[57] ABSTRACT

An improved switching regulator converts an unregulated DC voltage into a regulated DC output voltage and maintains regulation over the entire range from maximum load current through zero load current. The improved regulator employs a plurality of series switching paths connected between the unregulated DC input and a summing node at a filter capacitor output. Each series switching path includes a power switching element, a catch diode and a series inductor. The other end of the summing node is connected through a current limiting circuit to the DC regulated output, and at least a portion of the voltage at the summing node is fed to a voltage error amplifier and used to control the duty cycle of the series switching elements. Feedback from the current limiting circuit can override the voltage error amplifier control should the maximum current limit be exceeded. The switching control means employs pulse-width modulation for adjusting the duty cycle of the series switching elements, and the technique of pulse-width modulation employed in the present invention is of the constant frequency, variable "ON" time variety, as known in the art. The switching element control means utilizes a selecting means whereby different ones of the switching elements in different ones of the series switching paths are sequentially selected such that the selected series switching element is always turned on into a non-conducting inductor and a fully-recovered catch diode so as to minimize or eliminate the power loss associated with switch turn-on; the noise usually associated with switching regulators; and the turn-on transient which is often propagated into the supply line in the switching regulators of the prior art, thereby allowing highly efficient and reliable regulation to be maintained at very low values or even no value of load current.

22 Claims, 12 Drawing Figures

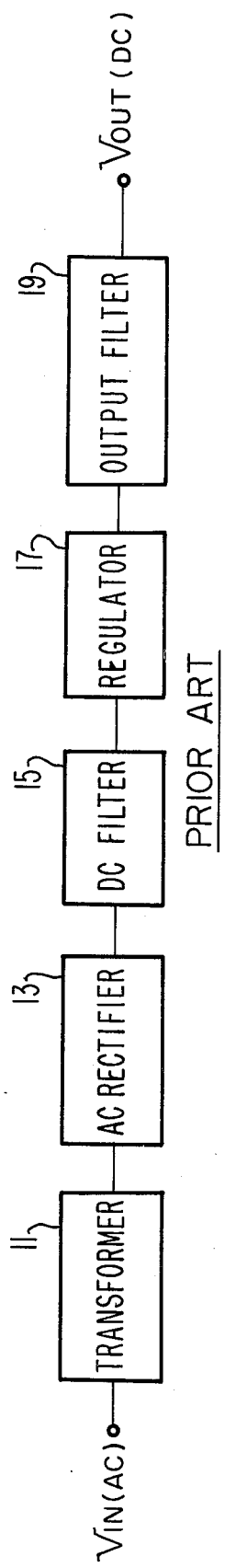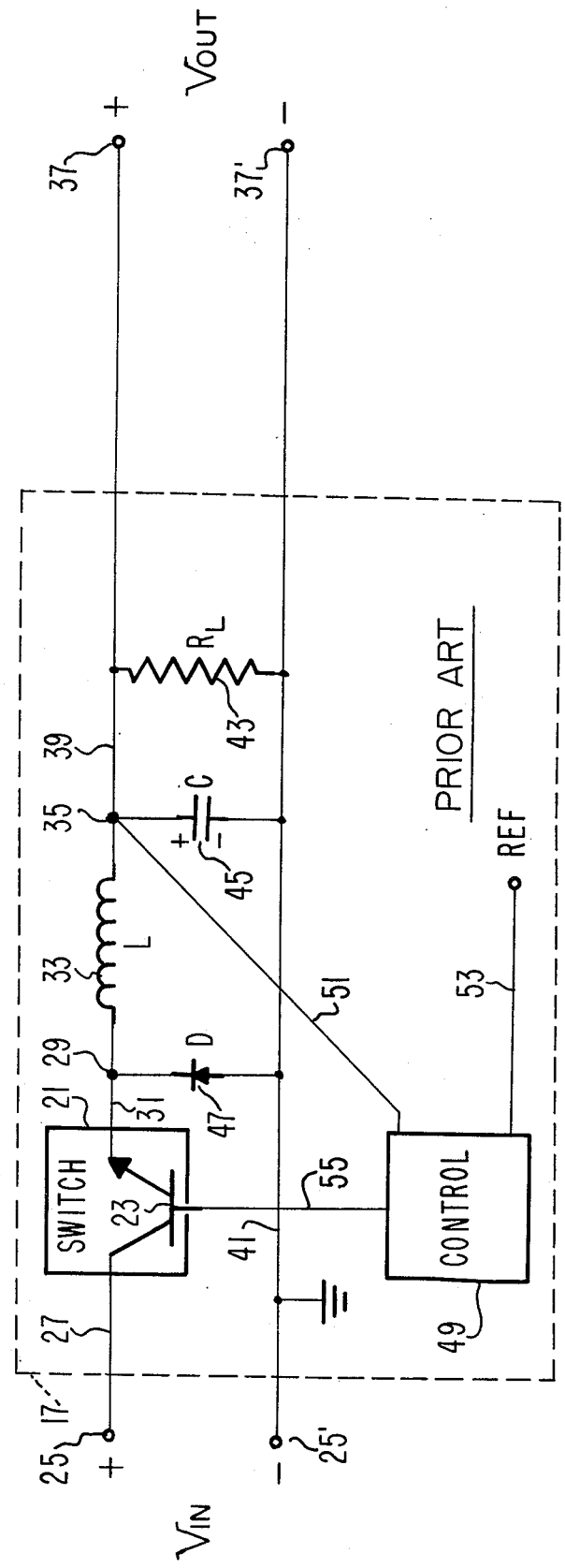
FIG.1.
FIG.2.

HIGH EFFICIENCY SWITCHING REGULATOR

BACKGROUND OF THE INVENTION

This invention relates generally to a switching regulator for a power supply and more particularly to a method and apparatus for digitally controlling the output of a power supply by varying the on-off duty cycle of power transistor switches wherein the switches are always turned on into a non-conducting inductor and a fully recovered catch diode.

Engineers involved in the design of computers, digital logic systems, precision controls, and similar applications spend much time and money attempting to design highly reliable power supplies. In addition to the high reliability criteria, considerations such as cost, efficiency, bulk and weight come into play, and specific considerations such as stability, noise and ripple must not be forgotten.

Some of the critical parameters effecting the reliability of the power supply, and ultimately most of the other design goals cited above, are thermal considerations. In general, the highest level of reliability is achieved by operating the electronic components as close to ambient temperature as possible. This governing principle dictates the size of the heat exchanger, and the trade-off involved between cooling system components and efficiency dictates the ultimate weight, bulk, cost and even the approach to circuit design used by the engineers. These thermal considerations are deeply affected by the method of regulation employed in the system.

When a load requires precision control of both voltage and current, and when an outside AC or DC source of energy is used, a system must usually incorporate a power supply using a regulator. Basically, a power supply regulator is either dissipative or non-dissipative. The dissipative regulator absorbs the difference between the input voltage at the source and the unregulated voltage at the load, and the power dissipation is given as $(V_{in} - V_{out})*I_L$. A non-dissipative regulator stores the excess power in an LC filter and delivers the power to the load in measured intervals. Non-dissipative regulators generally use switching devices to control the output power. During the time the switch is on, power is stored in an energy storage network (the LC filter) and is delivered to the load as required. Ideally, the switching approach exhibits no power dissipation. Since conventional dissipative series or shunt regulators operate the power-regulating transistor in a continuous-conduction mode, large amounts of power are dissipated at high current loads, especially when the input-output voltage difference is large.

The design of modern regulators is aimed at increasing efficiency and operating reliability while saving energy, hence most modern regulators are of the non-dissipative type. Power supply circuits using switching regulators have high efficiency under all input and output conditions. Since the power transistor switch is always either cut off or saturated, except for a very brief transition period between those two states, the switching regulator can achieve good regulation despite large changes in input voltage and maintain high efficiency over a wide range of load currents. The switching regulator regulates by varying the on-off duty cycle of a power transistor switch, and the switching frequency can be made very much higher than the line frequency, the filtering elements used in the power supply can be made small, light weight, low in cost and very efficient. It also becomes possible to drive the switching regulator with very poor filtered DC, thereby eliminating large and expensive line frequency filtering elements. Furthermore, it is possible to design switching regulators with excellent load-transient properties so that step increases in load current cause relatively small instantaneous changes in the output voltage, recovery from which is essentially completed in a few hundred microseconds. Since the overall efficiency of a high frequency switching regulator means less heat dissipated and less bulk, then the size of the heat exchanger may be reduced if the size of the inductors and capacitors is reduced because smaller valued devices can be used. It is not, therefore, unreasonable to see why the switching regulator has become increasingly popular in electrical design, not only in aerospace and defense applications, but in computers, logic systems, control systems, instrumentation and communication areas.

The switching regulator, however, is not without its disadvantages which preclude its use in some applications. The primary power source delivers current to the switching regulator in pulses which, for efficiency reasons, have short rise and fall times. In those applications where a significant series impedance appears between the supply and the regulator, the rapid changes in current can generate considerable noise. This problem can be minimized by reducing the series impedance, increasing the switching time, and/or filtering the input to the regulator. Another problem inherent in the use of switching regulators arises from the circuits response time to rapid changes in the load current. The switching regulator will reach a new equilibrium only when the average inductor current reaches its new steady state value. In order to make this time short, it is advantageous to use low inductor values or else to use a large difference between the input and output voltages.

Since many applications will not tolerate induced transients, the prior art is replete with various methods and apparatus aimed at preventing transient-induced damage, current surges and the like, and many systems have been designed to insure over-voltage protection, under-voltage protection and current limiting. Elaborate filters are often used on the input and output leads to eliminate or minimize electromagnetic or radio-frequency interference. Turn-on transient spikes and turn-off transient spikes often dictate the size of the inductor or filter capacitors, and various trade-offs must be made which limit the regulator's response bandwidth, efficiency and reliability. Several techniques of the prior art recommend completely surrounding the regulator in a shielded enclosure so as to eliminate or minimize noise leakage when the switching regulators are operating in frequencies having detectable harmonics.

SUMMARY OF THE INVENTION

It is an object of this invention to provide an improved switching regulator for use with power supply systems.

It is another object of the present invention to provide an improved method and apparatus for regulating a power supply by controlling the duty cycle of the series transistor switch so as to obtain regulation over the entire range of load currents such that no minimum load is required to maintain regulation.

It is still another object of the present invention to provide an improved method and apparatus for controlling a pulse-width modulated switching regulator which minimizes dissipated power thereby maximizing efficiency.

It is yet another object of the present invention to provide an improved switching regulator which insures a maximum efficiency for any given power switching element having a predetermined turn-on time and an increased overall regulator efficiency even for power switching elements having relatively slow turn-on times.

It is still a further object of the present invention to provide an improved switching regulator wherein the series transistor switching element is always turned on into a non-conducting inductor and a fully recovered catch diode.

It is yet a further object of the present invention to provide a method and apparatus for minimizing or eliminating the turn-on transient which is usually propagated into the supply line when a series switching element is turned on.

It is yet a further object of the present invention to provie an improved switching regulator whereby current-limiting is provided for protecting both the load and the series switching elements under all conditions of start-up and loading.

It is still a further object of the present invention to provide an improved switching regulator which allows a low L/C ratio to be used thereby resulting in a low surge impedance of the filter and a better transient behavior of the regulator with step changes in load current.

It is yet a further object of the present invention to provide a fold-back current-limiting scheme which results in lower power dissipation than usually associated with conventional current-limiting feedback arrangements.

It is still a further object of the present invention to provide an improved switching regulator in which reliable regulation is maintained at very low values of load current.

It is yet a further object of this invention to provide an improved switching regulator which minimizes or eliminates the noise inherent in prior art switching regulators for any given frequency of operation.

It is still a further object of the present invention to provide a regulator circuit which maximizes efficiency and operating reliability while minimizing cost, bulk and size.

It is still a further object of the present invention to provide an improved switching regulator which maximizes regulator efficiency and stability while minimizing transient noise and response-time associated problems.

These and other objects and advantages of the present invention are accomplished in a switching regulator system employing a plurality of series switching regulator paths coupled between an unregulated source of input voltage and a filter capacitor means. Each series switching regulator path includes a power switching element, a catch diode and a series inductor, and each of the paths is connected in parallel with the other series switching regulator paths. Current-limiting means and voltage error amplifier means feed back error signals from the filter capacitor output and are used to control a pulse-width modulator which controls the duty cycle of selected power switching elements. The power switching elements are selected in such a manner as to insure that a power switching element is only switched on into a non-conducting inductor and a fully recovered catch diode, thereby minimizing or eliminating the power loss normally associated with the switch turn-on; eliminating or minimizing the turn-on transients which are often propagated into the supply line by switching regulators of the prior art; eliminating or minimizing the noise usually associated with switching regulators; and allowing highly efficient and highly reliable regulation to be maintained over the entire range of load current from maximum load down to approximately zero load current.

BRIEF DESCRIPTION OF THE DRAWINGS

FIG. 1 is a block diagram of a typical prior art regulated power supply;

FIG. 2 is a schematic diagram of a typical prior art switching regulator;

DETAILED DESCRIPTION OF THE INVENTION

Figure 3:
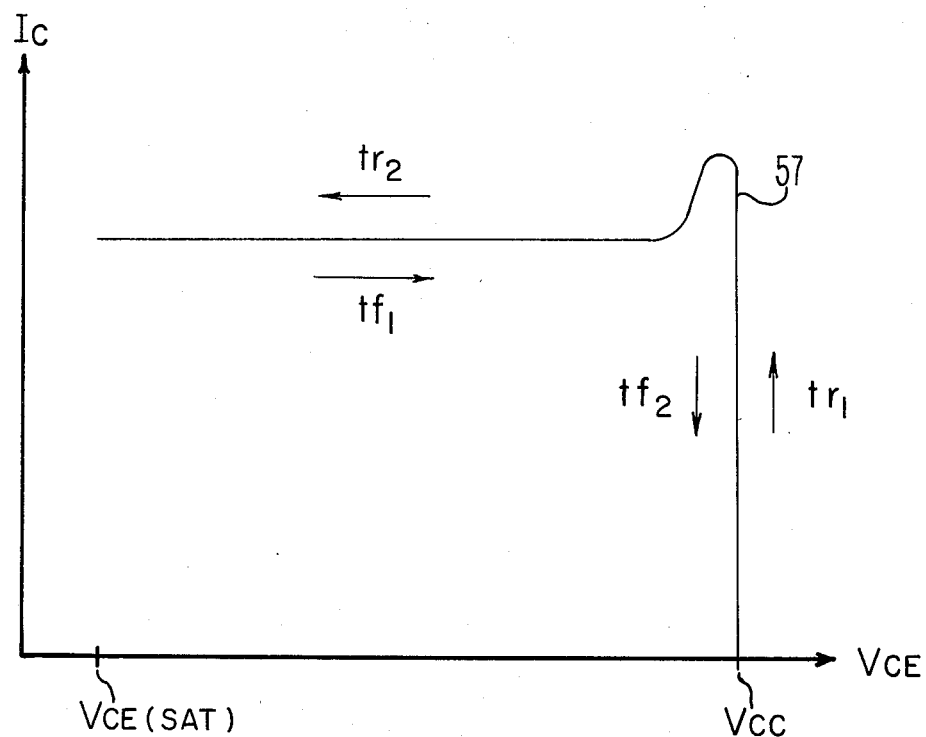
FIG. 3 illustrates the load line, current vs. voltage, peculiar to a prior art switching regulator as shown in FIG. 2.

FIG. 1 is a block diagram of a typical regulated power supply of the prior art. Block 11 represents a transformer of any type known in the prior art which could be used to transform the input AC electrical signal to a desired AC level. Block 13 rectifies the stepped-down or stepped-up AC signal in order to output DC current. Block 15 receives this DC current and filters the AC component from the rectified DC signal. Block 17 processes or regulates the filtered signal to provide a substantially regulated DC output, and an output filter, as represented by block 19, may be added to remove the high frequency hash and provide a regulated DC voltage at the output suitable for attaching to an external load. The exact structure of the transformer of block 11, the AC rectifier of block 13, the DC filter of block 15, and the output filter of block 19 are not critical to the present invention and may include any suitable transformer, rectifier, or filter respectively, as known in the prior art and as may be readily found in both the literature and the patents pertaining to regulated power supplies.

FIG. 2 shows a schematic diagram of a circuit such as may be found in the switching regulator of block 17 of the prior art regulated power supply system of FIG. 1. The circuit of FIG. 2 receives an unregulated DC input voltage, $V_{IN}$ and regulates a DC output voltage, $V_{OUT}$ despite variations or fluctuations in $V_{IN}$ and the load current $I_L$. The switching regulators of the prior art achieve regulation by varying the duty cycle ($\alpha$) of a power-transistor switch 21 rather than by varying the voltage drop across a power transistor which is operating in the linear mode. The power transistor switch may, for example, be comprised of a power transistor 23 as shown in FIG. 2 or, in the alternative, could be a silicon controlled rectifier, a Darlington switch, or a hydrid or modified Darlington switching device. Because the power switching element 21 is always operated in the saturated state when it is conducting and is otherwise completely non-conducting, except for a brief commutation time between the on and off states, the power dissipated in the switching regulator is much lower than it would normally be in the series regulator circuit wherein the voltage drop across the power transistor is changed while operating in the linear mode.

In the circuit of FIG. 2 the collector of the power transistor 23 serves as the switch input and is connected to the positive terminal 25 of the unregulated input $V_{IN}$ via lead 27 and the emitter of power transistor 23 serves as the switch output and is connected to a node 29 via lead 31. Node 29 is connected to one end of a choke coil or series inductor 33 whose opposite end is connected to a node 35. The node 35 is connected to the positive output terminal 37 via lead 39. A grounded lead 41 may be connected between the negative or grounded input terminal 25' of the unregulated input $V_{IN}$ and the negative or grounded output terminal 37' such that the regulated output voltage $V_{OUT}$ is taken between the output terminals 37 and 37'. A load resistor 43 is designated $R_L$ and is connected between output lead 39 and the grounded lead 41 and filter-capacitor 45 is designated by the letter C and is connected between node 35 and the grounded input lead 41. A free-wheeling or catch diode 47 is connected between node 29 and the grounded lead 41 and is designated in the circuit of FIG. 2 by the letter D. The catch diode 47 is poled with its cathode connected to node 29 and its anode connected to the grounded lead 41.

The signal which is present at node 35, and hence at output terminal 37, 37', is fed back from node 35 to the switch control circuit of block 49 via lead 51. A second input to the control circuit of block 49 could be taken via lead 53 from a source of reference potential and the contents of block 49 may be, for example, a voltage comparator or error detector which compares the feedback voltage from node 35 with the predetermined reference potential and utilizes pulse-width modulation techniques to control the duty cycle of the power transistor switch 23 via lead 55.

The operation of the switching regulator of FIG. 2 depends upon the duty cycle generated by the power switching element 21 and integrated by the choke coil 33, the filter capacitor 45, and the free-wheeling or catch diode 47 to transfer power efficiently from the higher input voltage $V_{IN}$ to the lower output voltage $V_{OUT}$ at a ratio determined by the duty cycle $\alpha$. The control circuit of block 49 causes the power switching element 21 to switch at a predetermined frequency and the period of conduction may be controlled by pulse-width modulation techniques as known in the art. During the time that the power transistor 23 is on, the input voltage $V_{IN}$ is applied to the input of the LC filter comprising series inductor 33 and filter capacitor 45, causing the current through the inductor 33 to increase. When the power transistor 23 is off, the energy stored in the inductor 33 maintains the current flow to the load by circulating through the loop including catch diode 47. The input of the LC filter is now at approximately zero volts allowing the inductor to release its stored energy until the current through the inductor decreases to its original value and the cycle repeats. The output voltage $V_{OUT}$ will equal the time average of the voltage at the input of the LC filter, and the control circuit of block 49 senses and regulates $V_{OUT}$ by controlling the duty cycle $\alpha$ such that if $V_{IN}$ increases, the control circuit of block 49 will cause a corresponding reduction in the duty cycle $\alpha$ so as to maintain a constant $V_{OUT}$ in accordance with the equation $V_{OUT} = \alpha X V_{IN}$.

Since the catch diode 47 conducts during the time that the power transistor switch 23 is open so as to provide a current path for the series inductor 33 to maintain current flow to the filter capacitor 45, the catch diode 47 must recover in the shortest possible time in order to optimize the overall circuit efficiency. Since the power transistor switch 23 is operated only in saturation or in cut-off, power dissipation is kept to a minimum. The power dissipated in an actual power transistor switch consists essentially of three components, the turn-on loss, the on-loss, and the turn-off loss. Previous to this, time switching regulator power supplies have turned on the power transistor switch 23 into an already conducting inductor 33 and a non-recovered catch diode 47 resulting in the load line of FIG. 3. When the power transistor switch 23 is turned on, a period $t_{r1}$ is required for the current to increase and relieve the catch diode 47 of its load. During this period of time, the collector voltage is essentially constant, as indicated by the vertical straight line $V_{CC}$ in the illustration of FIG. 3 since the catch diode 47 is still forward biased. The current overshoot which is illustrated by the hump 57 of the illustration of FIG. 3 represents the reverse recovery current of the diode. The period $t_{r2}$ is the time required for the voltage of the power transistor 23 to switch states. At this point it is well to note that $t_{r1}$ and $t_{r2}$ take place in sequence and must be added in order to arrive at the total turn-on time of the device. It should also be noted that the highest peak power dissipated by the transistor is a function of the switching time or recovering time of the catch diode 47. There exists some finite recovery time for the catch diode to become non-conducting and fully recovered. Current from the transistor must remove the charge stored in the catch diode 47, which is still in a state of forward conduction. Therefore, the power transistor 23 must supply current to the catch diode 47 as well as to the inductor during the turn-on phase. This is a prime source of noise generated in prior art switching regulators.

At turn-off, after a short period of storage time, the voltage across the transistor must rise until it exceeds the supply voltage by an amount necessary for the catch diode 47 to begin conduction. This period is designated $t_{r1}$. The current then begins to fall during the current decay $t_{r2}$, and during this time the reverse distribution of charge takes place from that of the rise time while the voltage remains constant at $V_{CC}$.

Figure 4:
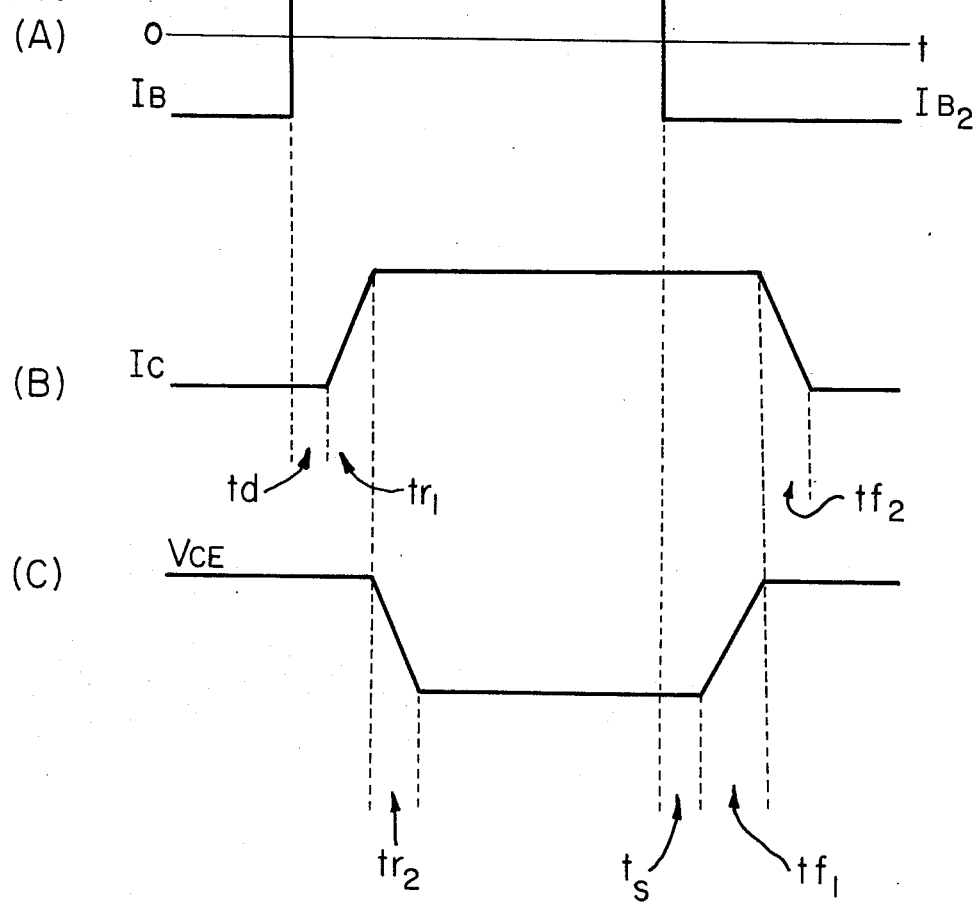
FIG. 4 is a waveform diagram useful in defining the switching times of a discrete transistor with a resistive collector load wherein the base is driven by a generator providing an ideal step function of current.

These switching times may be better understood by referring to the ideal switching waveforms of FIGS. 4A, 4B and 4C. Assuming that the base of the power transistor switch 23 is driven by a generator providing an ideal step function of current as shown in FIG. 4A, it can be seen that a finite delay designated $t_d$ occurs before the collector current begins to rise. Physically, delay time results because of the reverse bias on both the emitter and collector junctions. As the effective base-to-emitter voltage is increased from near zero, the depletion layers on both junctions must reduce in thickness accordingly, and this corresponds to an increase in the junction capacitance. The delay time is the time required to charge these capacitances to the new voltage levels. The interval of time required to reduce the collector-emitter voltage from 90% to 10% of its off value is defined as the rise time $t_r$. Rise time occurs because there exists a finite transit delay between base and collector currents and is a manifestation of the frequency response and current gain in the active region of the transistor. During the rise time of the collector current in the period $t_{r1}$, the collector voltage is essentially constant and the base current in this period must provide sufficient charge to the collector-to-base capacitance and to the base region so as to attain a new collector current level and maintain it against the re-combination rate. After the power switching transistor 23 has relieved the catch diode 47 of the full load current, it is necessary that the collector-to-base voltage be reduced to a new level of $V_{CE}$ saturated. The time required for this change is designated as $t_{r2}$ and is dependent upon the excess base current available to supply the charge. The current in an inductive load has been established and may be considered constant during the decrease of $V_{CE}$. The transistor base must be overdriven with current for $V_{CE}$ to fall to the saturation value in the shortest possible time.

The turn-off of the power switching transistor 23 consists of three basic time periods; storage time, voltage rise time, and current fall time which are designated $t$, $t_{f1}$, and $t_{f2}$ respectively, in the waveform of FIGS. 4B and 4C. The storage time $t_s$ is the interval of time from the instant of reversal of base drive current to the time when the collector-emitter voltage has increased to 10% of its final off-state value. During the on interval of the transistor, when it is saturated, excess carriers arise because the collector junction becomes forward biased. Storage time is the measure of time required for the excess stored minority carriers in the base and collector to recombine back to the level corresponding to the boundary between the active and saturation regions. Storage time is related to a carrier recombination process and is a measure of the minority carrier life time in the base and collector regions. The voltage rise time $t_{f1}$ occurs after the storage time when the voltage across the transistor must rise until it exceeds the supply voltage by the amount necessary for the catch diode 47 to begin conduction. In this period $t_{f1}$, the current is essentially constant so that a component of current must flow into the base and additional current is required to charge the collector-to-base capacitance to a new level. During the current decay time $t_{f2}$, the reverse-redistribution of charge takes place from that of current rise time. Since the on loss or conduction loss in the switching transistor is a function of $V_{CE}$, the current to the load, and upon the fraction of the full cycle that the transistor is in conduction, and upon the conduction loss of the catch diode which is determined by the forward drop of the diode, the current through the load, and the fraction of cycle that the diode conducts, it will be seen that conduction losses may be reduced by providing more efficient power switches, by changing the duty cycle, or by selecting catch diodes with low voltage drops and fast recovery times. The major portion, however, of the power lost in a switching regulator occurs during turn-on and turn-off. The present invention does not materially affect the power loss at turn-off but virtually eliminates or at least minimizes the power lost during the turn-on of the transistor power switch. Since the power switches employed in the switching regulators of the prior art have turned on the transistor switch into a conducting inductor and catch diode, the turn-on power dissipation loss is greatest during the period $t_{r1}$ when the transistor is increasing its conduction to nearly full current and is operating at full voltage. This loss is entirely eliminated by the present invention and it should also be noted that since the highest peak power dissipated by prior art switching transistors is a function of the switching time or recovery time of the catch diode, there exists the finite recovery time for the catch diode to become non-conducting. Current from the transistor must move the charge stored in the diode while it is still in forward conduction, hence the transistor must supply current to the catch diode as well as to the inductor during the initial turn-on. This loss is also eliminated by the present invention since the transistor is only switched on into a non-conducting inductor and a fully-recovered catch diode.

Figure 5:
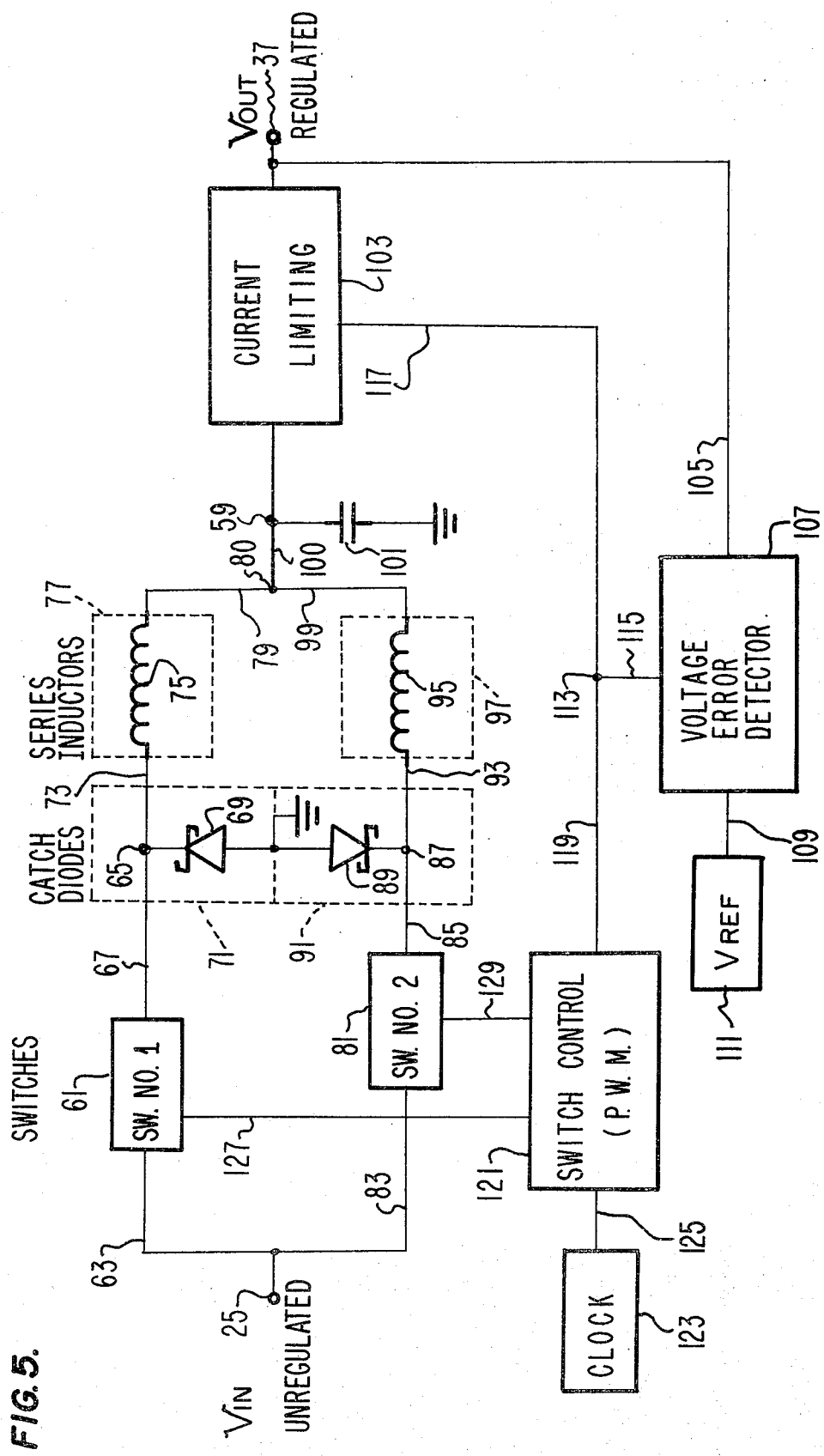
FIG. 5 is a block diagram of the high efficiency-high reliability switching regulator of the present invention.

FIG. 5 is a block diagram of the prime embodiment of the improved high efficiency, high reliability switching regulator of the present invention which could be inserted into the block 17 of the block diagram of FIG. 1. The unregulated DC input voltage could be supplied to input terminal 25 from the output of the DC filter of block 15 of FIG. 1. Two separate series switching regulator paths are connected between the $V_{IN}$ terminal 25 and a summing node 59. The first series switching regulator path includes a first power switch 61 which has its input connected to the $V_{IN}$ terminal 25 via lead 63 and its output connected to node 65 via lead 67. The node 65 is connected to the cathode of a Schottky power diode 69 whose anode is coupled to ground. This diode is included within the catch diode or free-wheeling diode stage of the series path as indicated by the dotted block 71 of the first series switching regulator path. The node 65 is also coupled via lead 73 to one end of a choke coil or series inductor 75 which is indicated as being contained within the dotted block 77 which represents the series inductor stage of the first series switching regulator path. The opposite end of the series inductor 75 is connected via lead 79 to the common summing node 59.

The second series switching regulator path includes a second power switching element 81 having its input coupled via lead 83 to the $V_{IN}$ input terminal 25 and its output coupled to a node 87 via lead 85. The node 87 is coupled to the cathode of a Schottky diode 89 whose anode is coupled directly to ground and Schottky diode 89 represents the catch diode or free-wheeling diode stage of the second series switching regulator path as indicated by dotted block 91. Node 87 is also coupled via lead 93 to one end of a second choke coil or series inductor 95 which represents the series inductor stage of the second series switching regulator path and is indicated by the dotted block 97. The other end of the second series inductor 95 is coupled to the common summing node 59 via lead 99. The common summing node 59 is capacitively coupled to ground through a filter capacitor 101. Summing node 59 is also connected to the $V_{OUT}$ regulated output terminal 37 through a current limiting circuit as represented by block 103. The output of block 103 is further connected via lead 105 to one input of a voltage error detector circuit as represented by block 107. The voltage error detector of block 107 receives a reference signal via lead 109 from a source of reference potential $V_{REF}$ which is represented by block 111. The output of the voltage error detector circuit of block 107 is supplied to an error signal node 113 via lead 115. Node 113 is also connected via lead 117 to the current limiting circuit of block 103 such that the signal on lead 117 is capable of overriding the signal on lead 115 should an overcurrent condition exist. Node 113 functions as an OR gate for low signals such that if either the output of the voltage error detector circuit of block 107 or the output of the current limiting circuit of block 103 is low, then a low reset signal is supplied via lead 119 to a switch control circuit which includes a pulse-width modulator and which is represented by block 121. The switch control circuit of block 121 receives fixed frequency pulses from a clock or oscillator as represented by block 123 via lead 125. The output of the switch control circuitry of block 121 will be supplied via lead 127 to control the duty cycle of the first regulator switching element 61 and via a second lead 129 to control the duty cycle of the second series switching element 81.

Figure 6:
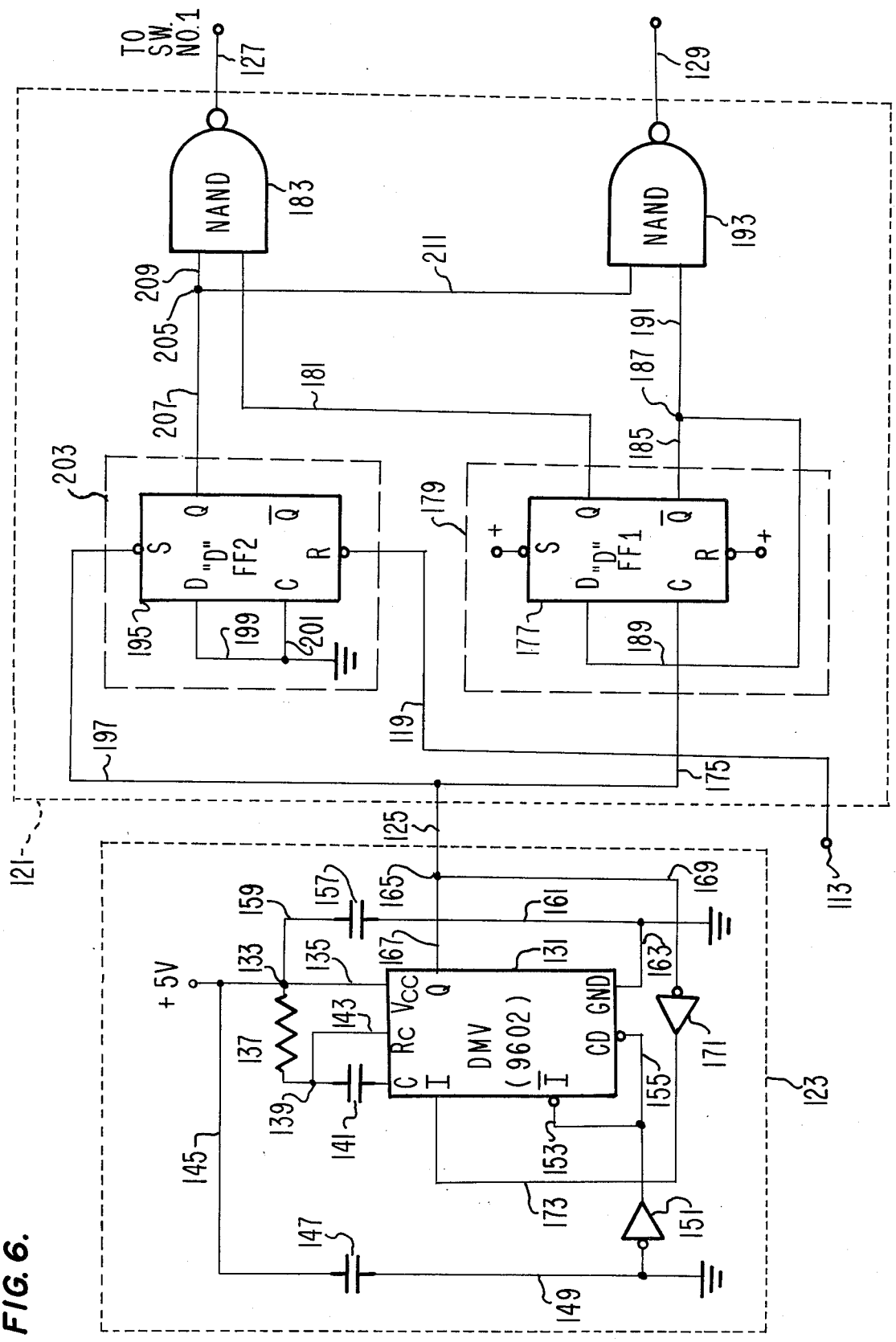
FIG. 6 is a schematic diagram of that portion of the block diagram of FIG. 5 comprising the clock 123 and the switch control circuit of block 121.

The specific circuitry of the various blocks of FIG. 5 will first be described and then the overall operation of the improved switching regulator of the present invention will be discussed. FIG. 6 discloses a schematic diagram of the oscillator or clock of block 123 of FIG. 5 and is indicated within the similarly numbered dotted block 123 and the dotted block labeled 121 represents a schematic diagram of the switch control circuitry and pulse-width modulator of block 121 of FIG. 5. The oscillator or clock of dotted block 123 includes a delay multivibrator 131 which may be, as known in the art, a standard T²L 9602 device. The device has been modified or connected as indicated below. The $V_{CC}$ input of the delay multivibrator 131 is connected to a supply input node 133 via lead 135, and the supply input node 133 is then connected directly to a +5 volt source of potential. The supply input node 133 is also connected through an RC time constant-establishing resistor 137 to RC node 139. The RC node 139 is coupled through the RC time constant-establishing capacitor 141 to the "C" input of the delay multivibrator 131 while the RC node 139 is connected directly to the "RC" input of delay multivibrator 131 via lead 143. The voltage supply input node 133 is further connected via lead 145 to a decoupling capacitor 147 whose opposite plate is grounded via lead 149. The grounded lead 149 is coupled to the input of a standard 936 DTL inverter 151 whose output is coupled via lead 153 to the "I" input of the delay multivibrator 131 and via lead 155 to the "CD" or forced clear input of the delay multivibrator 131. The voltage input supply node 133 is also coupled to the positive plate of the decoupling capacitor 157 via lead 159 and the opposite plate of the decoupling capacitor 157 is connected to ground via lead 161. The grounded lead 161 is also connected to the ground input "GND" of the delay multivibrator 131 via lead 163. The "Q" output of the delay multivibrator is connected to output node 165 via lead 167. The output node 165 is connected to the switch control logic of block 121 via lead 125 and is also connected via lead 169 to the input of a second standard 936 DTL inverter 171 whose output is connected via lead 173 to the "I" input of the delay multivibrator 131.

As known in the art, the RC time constant can be controlled by selecting the values of the RC time constant-establishing resistor 137 and capacitor 141 and, in the present case, the values have been selected in order to cause the delay multivibrator 131 to operate at a fixed frequency of approximately 36 KC with one narrow-width negative-going clock pulse having a width of approximately 50 nanoseconds occurring in each clock cycle.

The fixed frequency clock pulses are supplied to the input of the switch control logic of block 121 via lead 125. The clock pulses are supplied via lead 175 to the clock input "C" of a first "D" flip-flop 177 which is configured as a divide-by-two counter. The divide-by-two counter is enclosed within the dotted block 179 and represents the phasing, addressing or selecting network which alternately or sequentially selects first one and then the other of the two parallelly connected series switching regulator paths. The "S" and "R" inputs of flip-flop 177 are connected to a positive source of potential. The Q output is connected via lead 181 to a first input of a first NAND gate 183 and the "$\overline{Q}$" output is connected via lead 185 to an output node 187. The $\overline{Q}$ output node 187 is connected back to the D input of the first D flip-flop 177 via lead 189 and to the first input of a second NAND gate 193 via lead 191. The NAND gates 183 and 193 are standard 944 DTL NAND gates, as known in the art.

The clock pulses which are provided to the input of the control logic of block 121 via lead 125 are also supplied to the S or set input of a second D type flip-flop 195 via lead 197. The second D type flip-flop 195 is configured as a standard latch since the D and C inputs are directly coupled to ground via leads 199 and 201 respectively. The second D flip-flop 195 is shown as being enclosed within the dotted block 203 which represents the circuitry for effecting pulse-width modulation in the present invention. Other types of pulse-width modulation networks could be similarly used. The Q output of the latching flip-flop 195 is provided to the Q output node 205 via lead 207 and the Q output node 205 serves as the second input to NAND gate 183 via lead 209 and as the second input to NAND gate 193 via lead 211. The R or reset input of the latching flip-flop 195 is connected via lead 119 to the error signal node 113, as previously defined.

The operation of the switch control circuit of block 121 will now be described. The narrow-width pulses from the output of the oscillator or clock of block 123 are used to set the latch flip-flop 195 at the beginning of each cycle and are used to clock the counter flip-flop 177 so as to switch the state of its outputs. When the flip-flop latch 195 is set, the Q output goes high and will remain high until the flip-flop latch 195 is reset by the arrival of a low reset signal representing a current override condition or the termination of an error voltage signal via lead 119. Hence the flip-flop 195 is operated at a fixed frequency and the width of the output pulse is controlled or modulated by the time of occurrence of the reset signal which is fed back from the error detecting networks of block 103 and block 107 of FIG. 5. The modulated output pulse is supplied from the Q output of the latch flip-flop 195 to the second input of NAND gates 183 and 193 via leads 209 and 211 respectively. Whichever of the two NAND gates 183 and 193 which has currently been enabled by the divide-by-two counter flip-flop 197 will then generate or gate a negative-going drive control signal to the switch in its respective series switching regulator path, and this drive control signal will be gated for the duration of the modulated output pulse present at the Q output of latching flip-flop 195.

The one of the two NAND gates 183, 193 which is currently selected or addressed is determined by the state of the counter flip-flop 177 which is configured as a divide-by-two counter so that it alternately enables first one and then the other of the NAND gates 183 and 193, respectively since each successive clock pulse operates to complement the outputs of the counter flip-flop 177. The nature of the pulse-width modulation control signal which is supplied to the reset input via lead 119 is such that when no correction is necessary, the signal is normally low tending to cause the latch to try to reset. When the narrow, negative-going clock pulse arrives at the set input via lead 197, the latching flip-flop 195 is set for the duration of the negative-going clock pulse causing the Q output to go high for this narrow 50 nanosecond period. At the end of the 50 nanosecond period the clock pulse again goes high at the set input, and since the reset input is already supplied with a low signal to cause reset, the Q output will be reset to a low condition so that the selected NAND gate 183 or 193 will only be able to conduct or gate the narrow negative-going drive control signal for the 50 nanosecond period during which the latch 195 was set. This is an important aspect of the present invention since if no current load is present on the power supply and if no correction is necessary, the drive control pulses from the output of the NAND gates 183 and 193 will only be present for the short 50 nanosecond clock period. This will cause the NAND gates 183 and 193 to be enabled at the start of each and every cycle so as to discharge all capacitances and ready the switch drive circuits, but the respective switch will not be able to turn on during the 50 nanosecond period since switching cannot generally be accomplished in so short a time. Hence the circuit operates to anticipate the presence of an error and is ready to make a correction at the beginning of each and every cycle, but if no error is present, the switch drive means is not enabled for a period long enough to actually turn on the corresponding power transistor switch thereby preserving the present error-free regulated output.

Figure 7:
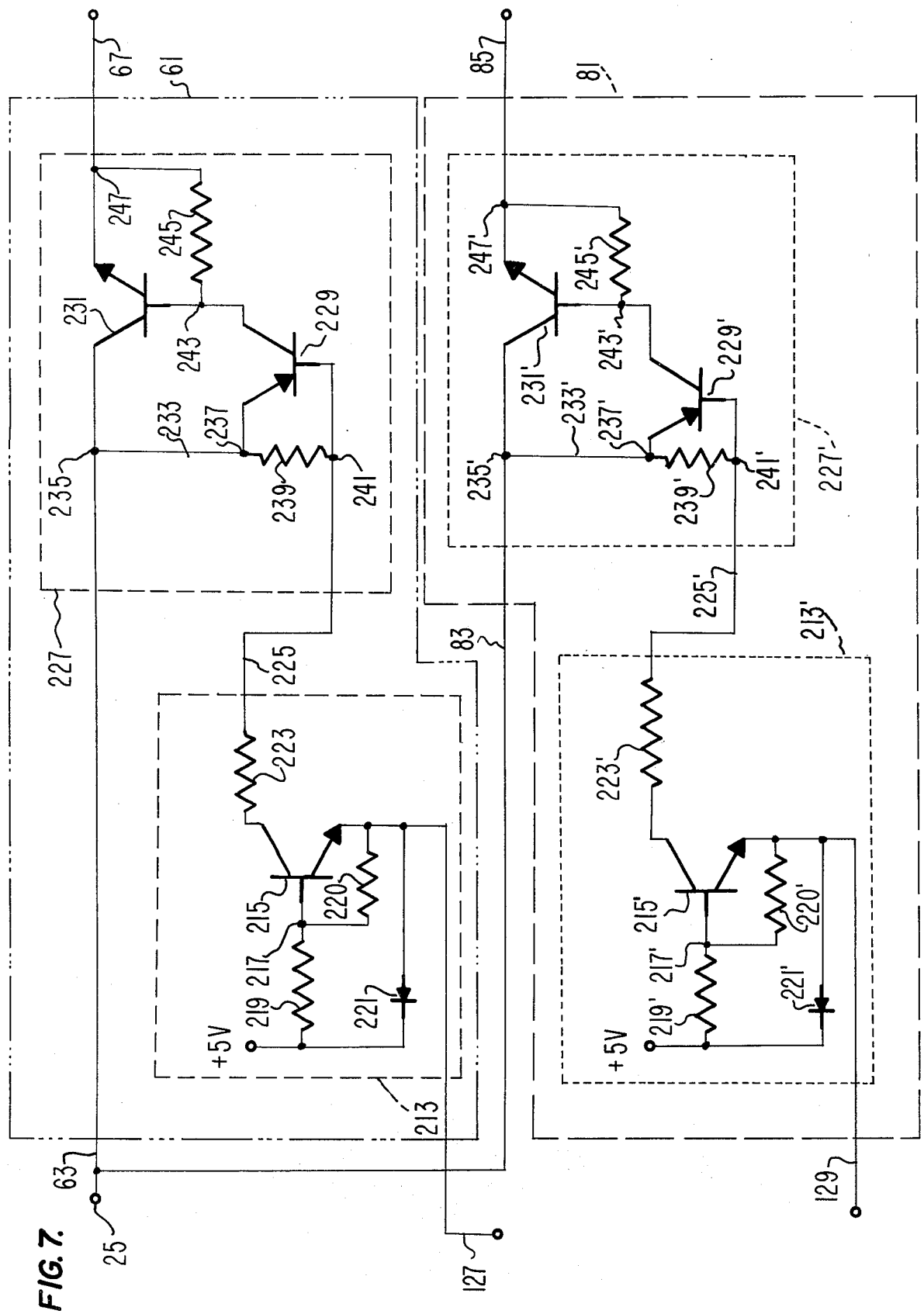
FIG. 7 is a schematic diagram of the series switching elements of block 61 and block 81 of FIG. 5.

FIG. 7 illustrates a schematic diagram of the contents of the regulator switch No. 1 which is shown as being enclosed within the dotted block 61 in the circuit of FIG. 7 and a schematic diagram of the contents of the second regulator switch which is shown as being enclosed within the dotted block 81 of the circuit of FIG. 7. The source of unregulated input voltage, $V_{IN}$, which in the prime embodiment of the present invention was +24 volts, is taken from the $V_{IN}$ input terminal 25 and supplied via lead 63 to the circuit of block 61 and via lead 83 to the circuit of block 81. The output of NAND gate 183 of the circuit of FIG. 6 is supplied via lead 127 to the input of a first power switch driver circuit which is enclosed within dotted block 213. The first driver circuit comprises a drive transistor 215 whose base is connected to a base node 217. Base node 217 is connected to one end of a biasing resistor 219 whose opposite end is connected to a +5 volt source of potential. Base node 217 is also connected through a second biasing resistor 220 to the emitter of drive transistor 215. The emitter of drive transistor 215 is connected to the anode of a diode 221 whose cathode is connected to the +5 volt source of potential and the emitter is coupled directly via lead 127 to the output of NAND gate 183. The collector of drive transistor 215 is connected through a collector-resistor 223 to a driver output lead 225. The driver output lead 225 is connected to the control electrode input of a dotted block 227 which represents a modified or hybrid Darlington power transistor switch. The hybrid Darlington transistor switch of block 227 includes a first PNP transistor 229 which has its base connected directly to the drive lead 225, and a second NPN transistor 231 which has its collector connected to the +24 volt source of potential via lead 63 and collector node 235 which serves as the switch input. The collector node 235 is directly coupled to the emitter of the PNP transistor 229 at emitter node 237 via a direct connection as represented by lead 233. The emitter node 237 is directly coupled to one end of a resistor 239 whose opposite end is connected to a base node 241 which connects to the base of the PNP transistor 229 and serves as the control electrode input to the switch. The collector of the PNP transistor 229 is connected directly to the base of the NPN transistor 231 at node 243 and node 243 is coupled to one end of a resistor 245 whose opposite end is connected to an emitter output node 247 of the NPN transistor 231. The output of the power switch is taken from the emitter output node 247 and supplied via lead 67 to the catch diode-series inductor circuit of FIG. 8, as hereinafter described.

Figure 8:
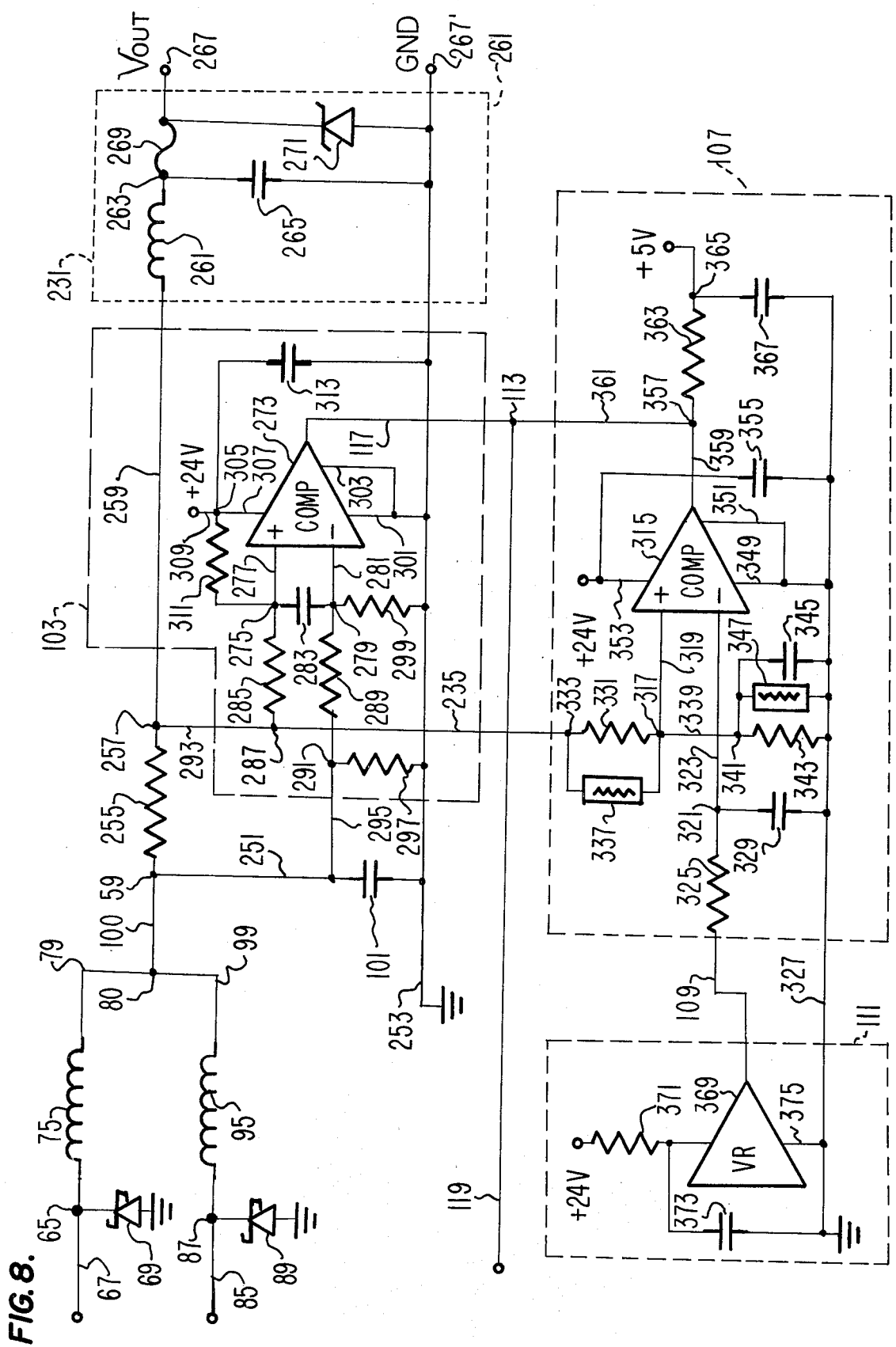
FIG. 8 is a schematic diagram of that portion of the block diagram of FIG. 5 including the catch diodes, the series inductors, the filter capacitor 101, the current limiting circuit of block 103, the voltage error amplifier circuit of block 107, and the voltage reference source of block 111.

The contents of the second series regulator power switch of block 81 are identical in structure to the corresponding elements of block 61 and have been shown with identical numbers which have been primed in order to distinguish the first from the second series switching elements with the exception that the input to the power transistor driver of block 213' is taken from the output of NAND gate 193 and supplied to the driver of block 213' via lead 129 and the switch output node 247' of the hybrid Darlington power switch of block 227' is connected via lead 85 to the catch diode and series inductor of the second series regulator switching path of FIG. 8 via lead 85.

In operation, whenever one of the NAND gates 183 or 193 gates a negative drive control signal, this signal is fed to the emitter of drive transistor 215 or 215' causing the transistor 215 or 215' to conduct and supply base drive current to the switch control electrode or base of PNP transistor 229 or 229'. If the duration of application of base drive current is long enough, the hybrid Darlington switch of block 227 or 227' will turn on so as to apply the unregulated input voltage from the $V_{IN}$ input 25 to be coupled to the switch output node 247 or 247'.

The first series switching regulator path continues with lead 67 connecting to node 65 as previously described. Node 65 is connected to the cathode of a Schottky diode 69 whose anode is grounded, the Schottky diode serving as the catch diode or freewheeling diode represented generally by dotted block 71 of the circuit of FIG. 5. Node 65 is also connected to one end of a choke coil or series inductor 75 whose other end is connected via lead 79 to a node 80. Similarly, the output of the modified Darlington power switch of block 81 is supplied via lead 85 to a node 87. Node 87 is similarly coupled to the cathode of a Schottky diode 89 whose anode is grounded, the Schottky diode serving as the catch diode or freewheeling diode of block 91 of FIG. 5. Node 87 is connected to one end of a choke coil or series inductor 95 whose other end is coupled via lead 99 to the node 80 so as to complete the parallel connection of a pair of series switching regulator paths between the positive $V_{IN}$ input terminal 25 and node 80. Node 80 is connected via lead 100 to a common summing junction node 59 and is actually a single node. The summing node 59 is connected to one plate of a filter capacitor 101 via lead 251 and the opposite plate of the filter capacitor 101 is connected to a grounded lead 253. Summing node 59 is connected to one end of a current-sensing resistor 255 whose opposite end is connected to node 257. Node 257 is connected via lead 259 to the input of an output filter as indicated by the dotted block 231 which is used to eliminate the high frequency hash. The output filter comprises a choke coil 261 which has one end connected to the lead 259 and the opposite end connected to a node 263. Node 263 is capacitively coupled to the grounded lead 253 via a filter capacitor 265, and the node 263 may be connected to an output node 267 via a fuse 269 or similar protective device. A zener diode 271 may be connected with its cathode coupled to the regulated $V_{OUT}$ output terminal 267 and its anode coupled to a ground terminal 267' which is directly coupled to the grounded lead 253. The regulated output voltage $V_{OUT}$ is taken between the output terminals 267 and 267' and the zener diode 271 provides additional protection, as known in the art.

The current-limiting circuit of block 103 of the circuit of FIG. 5 will next be described with reference to the circuit enclosed within the dotted block 103 of FIG. 8. At the heart of the current-limiting circuit of block 103 is a differential voltage comparator 273 having a positive and a negative input and an output. The positive input is connected to a positive comparator input node 275 via lead 277 and the negative comparator input is connected to a negative comparator input node 279 via lead 281. An RC time constant-establishing capacitor 283 is connected between the positive comparator input node 275 and the negative comparator input node 279. The positive comparator input node 275 is connected to one end of a first RC time constant-establishing resistor 285 whose opposite end is connected to a node 287 and the negative comparator input node 279 is connected to one end of a second RC time constant-establishing resistor 289 whose opposite end is connected to a node 291. Node 287 is connected to node 257 via lead 293, and node 291 is connected to the common summing node 59 via lead 251 and lead 295. As previously indicated, lead 251 also connects the summing node 59 to the positive plate of the filter capacitor 101. Node 291 is also resistively coupled to the grounded lead 253 via a resistor 297. Node 279 is similarly coupled to the grounded lead 253 via resistor 299, and the negative supply inputs of the differential voltage comparator 273 are connected to the grounded lead 253 via leads 301 and 303 respectively. The positive supply input is connected to a positive supply input node 305 via lead 307. The positive supply input node 305 is connected directly to a +24 volt source of potential via lead 309; is resistively connected back to the positive comparator input node 275 through a resistor 311; and is capacitively coupled to the grounded lead 253 via capacitor 313. The output of the differential voltage comparator 273 is connected via lead 117 to the error signal summing node 113 and, as previously described, the signal from the error summing node is transferred back to the reset input of the latching flip-flop 195 of FIG. 6 via lead 119 and used to modulate the pulse width of the output of the latch. When no over-current condition exists, the output of the differential voltage comparator is high but the detection of an over-current through the current-sensing resistor 255 causes it to go low thereby resetting the latching flip-flop 195 regardless of the state of the voltage error signal hereinafter described.

The voltage error detector circuitry of block 107 of FIG. 5 will now be described in detail with reference to the circuit enclosed within the dotted block 107 of FIG. 8. At the heart of the voltage error detecting circuit of block 107 is a second differential voltage comparator 315 having a positive and a negative input and a comparator output. The positive input of the differential voltage comparator 315 is connected to a positive voltage comparator input node 317 via lead 319, and the negative input is connected to a negative voltage comparator input node 321 via lead 323. The negative voltage comparator input node 321 is connected to one end of a first negative comparator input resistor 325 whose opposite end is connected to a reference source via lead 109. The negative voltage comparator input node 321 is also capacitively coupled to a grounded lead 327 via a first negative comparator input capacitor 329. The combination of the first negative comparator input resistor 325 and the first negative input capacitor 329 establish a first RC time constant at the negative input to the differential voltage comparator 315.

The positive comparator input node 317 is connected to one end of a second comparator input resistor 331 whose opposite end is connected to a node 333. Node 333 is connected via lead 235 to node 287 and thence via lead 293 to node 257. A tweaking resistor 337 is connected across the second comparator input resistor 331 so as to enable a one-time initial adjustment to be made so as to insure the proper operation of the circuit. The positive input comparator node 317 is also connected via lead 339 to a node 341. Node 341 is resistively coupled to the grounded lead 327 through a resistor 343 and is capacitively coupled to the grounded lead 327 through a second or positive comparator input capacitor 345. A second tweaking resistor 347 is connected across the resistor 343 to allow for a one-time correcting adjustment to be made for proper operation of the circuit. The negative power supply inputs of the differential voltage comparator 315 are connected to the grounded lead 327 via leads 349 and 351, while the positive supply input is connected to a +24 volt source of potential via lead 353 and is capacitively coupled to the grounded lead 327 through a capacitor 355. The output of the differential voltage comparator 315 is supplied to comparator output node 357 via lead 359 and thence via lead 361 to the error signal summing node 113 as previously described. The output node 357 is also connected to one end of a pull-up resistor 363 whose opposite end is connected to node 365. Node 365 is directly connected to a +5 volt source of potential and is capcitively coupled to the grounded lead 327 via a capacitor 367.

The source of reference potential labeled $V_{REF}$ and indicated as block 111 of the circuit of FIG. 5, is indicated as being enclosed within the dotted block of FIG. 8 labeled 111 and comprises a standard off-the-shelf voltage regulator such as a standard 723 voltage regulator, or the like. The regulator 369 has its positive supply input connected to a +24 volt source of potential through a resistor 371, and furthermore has its positive supply input capacitively connected to ground through a capacitor 373. The negative supply input is similarly grounded via a connection to grounded lead 327 via lead 375.

The operation of the circuit of FIG. 8 may be described briefly as follows. The regulated output signal $V_{OUT}$ is supposed to be held at a constant level of +12 volts but variations in the supply input or in the load may cause the output voltage to vary. These voltage variations are sensed via lead 235 and the output voltage or some voltage proportional to it, is compared with an established reference voltage by the differential voltage comparator 315. The output of the differential voltage comparator will be low when $V_{OUT}$ is at the proper level indicating that no error is present and that no correction is necessary. This normally low signal will override the normally high signal from the output of the differential voltage comparator 273 of the current-limiting circuit and operate to cause the latching flip-flop 195 to reset as soon as the clock pulse goes positive as previously described. However, when the output voltage varies, the output of the differential voltage comparator 315 will go high and an error signal will be presented to the error summing node 113 for transmission back to the reset input of the latch flip-flop 195 of FIG. 6 and will be used to modulate the output of the latch so as to allow the switch to be driven for so long as the voltage error exists during a given cycle. The high voltage error signal prevents the latching flip-flop 195 from resetting until the error is corrected causing the voltage error signal at the output of the differential voltage comparator 315 to go low thereby resetting the latching flip-flop 195 and terminating the supply of base drive current to the switch. The differential voltage comparator 273 has the RC time constant of its inputs established so that it senses the occurrence of an over-current condition by sensing the voltage drop across the current sensing transistor 255. So long as an over-current condition does not exist, the output of the differential voltage comparator 273 remains high indicating that no error is present, but in the event that an over-current condition is sensed, the output of the differential voltage comparator 273 will go low and regardless of the presence of a high voltage error signal the output of the comparator 273 will present a low reset signal representing an overcurrent condition to the error signal summing node 113 for resetting the latch flip-flop 195 as previously described.

The overall operation of the system of the present invention will now be described with general reference to the block diagram of FIG. 5 and with particular reference to the circuits of FIGS. 6, 7 and 8. The clock or oscillator of block 123 operates at a constant frequency so as to generate a series of narrow-width negative-going clock pulses. These clock pulses are used to control the operation of a divide-by-two counter designated as block 179 such that the positive-going edge of each of the narrow-width clock pulses causes the counter flip-flop 177 to be complemented so that NAND gates 183 and 193 are alternately enabled by the output of the counter flip-flop 177. The NAND gate which is currently enabled determines which one of the pair of series switching regulator paths are to be selected in that given cycle and the latch flip-flop 195 controls the period during which the output of the enabled NAND gate, either NAND gate 183 or NAND gate 193 depending on which one was currently enabled by the flip-flop 177, has its output go low to enable the corresponding drive circuit of blocks 213 or 213' to drive its respective power switch. The period during which drive current is supplied is determined by pulse-width modulation techniques. If no error is present, the signal present at the error signal summing node 113 is low due to the normal output of comparator 315, and since this low is supplied via lead 119 to the reset input of the latching flip-flop 195, the output of the NAND gate will be low representing a drive control signal or command only for the short period of time during which the set input of latch flip-flop 195 receives the negative-going clock pulse. Since this occurs when no error signal is present, we do not wish to turn one of the regulator switches on, and this is accomplished since the short period during which the output of the selected NAND gate 183 or 193 is low, is too short to allow one of the power switches to be turned on. Should, however, a voltage error signal exist at the error summing node 113, then a high signal will be present which will remain high so long as the error condition persists. If, for example, the voltage $V_{OUT}$ is only slightly low, the high signal which is present at the error summing node 113 will be high for some period of time greater than the duration of a clock pulse but less than the entire cycle. This high will be supplied to the reset input of the latch flip-flop and will operate as follows.

When the clock pulse caused the latch 195 to be set, the positive-going edge would normally allow the latch to be reset if a low were present at the reset input, as was the case discussed above wherein no voltage error signal was present at the error summing node 113. But, in the present case, an error signal is present which persists for some period of time after the narrow clock pulse has again gone positive after setting the latch 195. This positive pulse at the reset input of the latch 195 will allow the Q output to remain high until the trailing edge of the error signal goes low when the voltage error has been corrected. At this time the latch will be reset and the Q output will go low thereby disabling the selected NAND gate 183 or 193 and terminating the drive control command. If, on the other hand, a large voltage error is detected, then the high error signal which is present at the error summing node 113 will be supplied back to the reset input of latch 195 via lead 119 and will cause the latch to remain set until the error is eliminated, hence the Q output may remain high for many clock cycles such that first one series regulator switch and then the other etc. is driven by the selected NAND gates 183 or 193 and for the full time that the NAND gates 183 and 193 are enabled and this continues until the error condition is corrected. Whichever of the NAND gates is currently enabled, the low drive control command at its output will cause its respective transistor driver 213 or 213' to switch to a conductive state so as to supply base drive current to the base of the respective PNP transistor of the modified Darlington combination. If this drive current is maintained for only a short period, such as the duration of one of the narrow negative-going clock pulses, there will be insufficient time to drive the Darlington switch to an "on" condition. This is desirable since this situation represents the absence of an error signal and we would not want to turn the power switch on. If, however, the output of the selected NAND gate 183 or 193 is low for a longer period of time, the drive transistors 213 or 213' will drive their respective power switches 227 or 227' to the on state. When the selected power switching element 227 or 227' is turned on, the +24 volt source of potential is directly connected to the corresponding series inductor 75 or 95 respectively. Since a plurality of series switching regulator paths are utilized and alternate paths are selected so that the previously selected inductor has had a chance to release its stored energy to the load and filter capacitor 101 and the corresponding catch diode has had a chance to become fully recovered, the selected power switch 227 or 227' is always turned on only into a non-conducting series inductor 75 or 95 and a fully recovered catch diode 69 or 89, respectively depending on the selected series switching regulator path. This insures the minimization or elimination of the initial turn-on power dissipation loss normally associated with turning on a power transistor; eliminates the turn-on noise usually associated with the regulator switch; and eliminates the transients usually associated with switch turn-on and the method of obtaining these advantages will be described hereinafter with reference to the waveforms of FIG. 9. When one of the switches is initially turned on, the current will build in the series inductor in that path and current will be supplied to the summing node 59, while at the same time the inductor in the previously selected series switching path is discharging its energy to the summing node 59 via the conduction of the catch diode in that series circuit. Well before the selected switch is turned off, the inductor in the other series switching path has completed the discharge of its energy and the catch diode associated with it is fully recovered so that when the opposite switching element is turned on, it is once more into a non-conducting inductor and a fully recovered catch diode. This operation can be insured by adding additional series switching regulator paths as hereinafter described. The voltage at the summing junction 59 is filtered via output filter 231 and supplied to output terminals 267 and 267' as the regulated output voltage $V_{OUT}$. As the load varies or the input voltage varies, the voltage at node 257 will undergo a corresponding variance and as this voltage is compared with the reference voltage from reference source 111 at the inputs of the differential voltage comparator 315, the output of the comparator 315 will go high so long as the voltage error condition exists. As previously described, this high error signal is transmitted back to the reset input of the latch 195 for pulse-width modulation purposes. Should an over-current condition exist, the over-current will be detected by sensing the voltage drop across the current-sensing resistor 255 which is fed to the RC networks connected to the inputs of the differential voltage comparator 273 so that when an over-current condition exists, the output of comparator 273 will go low, presenting an over-current override low reset signal to the error signal summing node 113 which will cause the pulse at the output of latch 195 to go low regardless of the presence or absence of a voltage error signal.

In essence then, the differential voltage comparator 315 is used to sense when the divided-down output voltage of the power supply has exceeded a predetermined reference voltage. The binary output of the comparator 315 is used to delay the reset of the latch flip-flop of the switch control block 121 so as to disable the selected series power switch to discontinue the charging of the corresponding series inductor when the voltage error condition has been corrected. Simultaneously, the binary output of the over-current sensing comparator 273 is ORed (for low signals) with the binary output of the voltage sensing comparator 315 at the error signal summing node 113 and used to immediately reset the latch flip-flop to turn off the selected series power switch to discontinue the charging of the corresponding inductor should an overcurrent condition exist.

Figure 9:
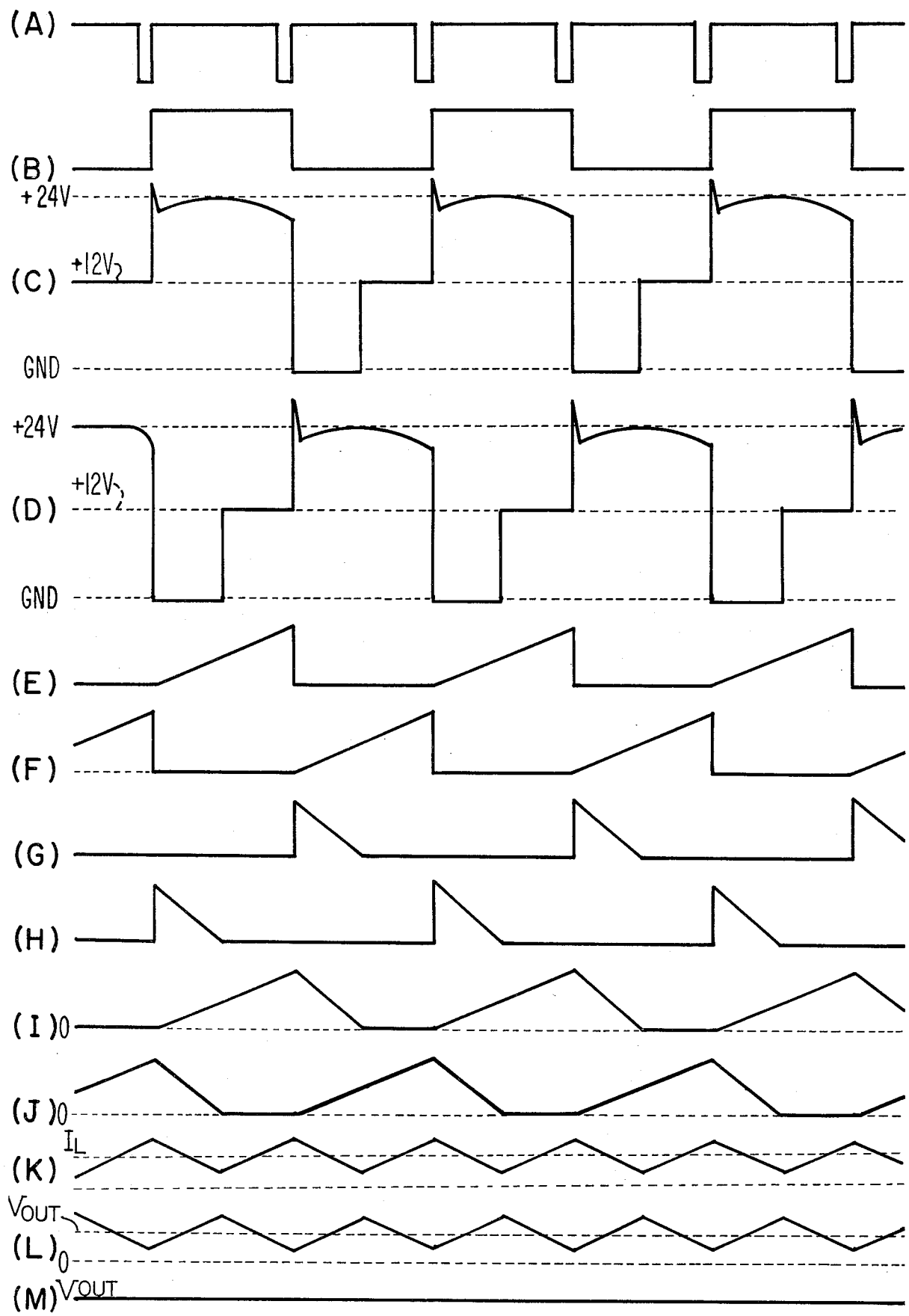
FIG. 9 is a waveform diagram useful in illustrating the operation of the switching regulator of the present invention.

A further explanation of the operation of the circuit of FIG. 5 will be made with reference to the waveform diagrams of FIG. 9 and occasional reference will be made to the specific circuitry of FIGS. 6, 7 and 8. FIG. 9A respresents the output of the oscillator or clock or block 123 and it may be noted that the negative-going, narrow-width clock pulses have a duration of approximately 50 nanoseconds. The waveform of FIG. 9B represents the Q output of counter flip-flop 177, and it will be noted that the counter flip-flop 177 is complemented on the high-going edge of each negative clock pulse. The $\overline{Q}$ output of the counter flip-flop 177 would appear as the inverse of that shown in FIG. 9B. This waveform is typical of the output of a divide-by-two counter or flip-flop. The waveform of FIG. 9C represents the voltage at the output of the power switching element as may be taken at output node 247 of FIG. 7 so as to be transferred by lead 67 to node 65. This waveform shows that the divide-by-two flip-flop 177 has enabled NAND gate 183 causing a low at its output. The circuit illustrates a maximum voltage error condition or the maximum correction possible by the pulse width modulation techniques of the present invention. Since the voltage error persists, a high voltage error signal is present at the reset input of latch flip-flop 195 for the entire cycle causing the Q input to stay high or set and NAND gate 183 to gate a low drive control command signal until the couter flip-flop 177 is complemented by the positive-going edge of the next negative clock pulse thereby selecting the other NAND gate for enablement during the next full clock cycle. The slight initial voltage spike appears since the full +24 volt input is instantaneously applied across the switch assembly 227 and the slight curvature near the +24 volt level occurs due to the change in the resistivity of the switch and the inductor as the current changes and charges the inductor. When the positive-going edge of the next clock pulse complements the counter flip-flop 177, the power switch assembly 227 is turned off. As soon as the power switch 227 is turned off, node 65 drops to ground or approximately to ground assuming that the voltage dropped across the catch diode 69 is negligable. This condition persists so long as the inductor continues to discharge its stored energy into the output load and the filter capacitor 101 as circulation is maintained in the loop formed between the inductor, the parallel combination of the filter capacitor 101 and the load, ground, and the catch diode 69. As soon as the series inductor 75 has discharged its stored energy, node 65 will attain the output voltage of summing node 59, which is approximately +12 volts for the present circuit, assuming that the voltage dropped across the current sensing resistor 255 is negligable for descriptive purposes. Node 65 will remain at this +12 volt level until the next positive-going edge of a clock pulse again complements the counter flip-flop 177 and causes the power switch 227 to be switched on once more to repeat the cycle.

Exactly the same sequence of operation applies with respect to the waveform of FIG. 9D for the second series switching path such that the waveforms are 180° out of phase with one another. The waveform of FIG. 9E represents the current through the power switch 227 and it will be noted that it starts at zero the beginning of each cycle since it is initially looking, in each and every case, at a non-conducting series inductor 75 and a fully-recovered catch diode 69. The current climbs in an approximately linear manner as it stores energy in the inductor 75, and drops to zero as soon as the power switch 227 is turned off. It remains at zero until the switch is once more activated. The waveform of FIG. 9F shows a similar waveform which is 180° out of phase and represents the current through the other series power switch 227'. The waveform of FIG. 9G represents the current through the catch diode 69. It will be noted that this current begins to flow as soon as the power switch 227 is turned off and represents the current flowing in the loop comprising the series inductor 75, the filter capacitor 101 and load combination, ground, and the catch diode 69. This current waveform begins when the switch is turned off and represents the release of the energy that was stored in the inductor during the turn-on portion of the cycle. It will be observed that the current only flows through the diode for a brief period of time compared to the time during which the inductor is charged when the switch 227 is on since after the switch is turned off, the inductor gives up its stored energy to the filter capacitor 101 and load via the catch diode loop. The waveform of FIG. 9H is again similar to that of FIG. 9G but is 180° out of phase therefrom and represents the current through catch diode 89 of the second series path. The waveform of FIG. 9I represents the current through the first series inductor 75. It will be noted that the current through the series inductor 75 is the sum of the current through the power switch 227 of FIG. 9E and the current through the catch diode 69 of FIG. 9G and illustrates that when the switch is initially turned on, the current builds in a rather linear manner in the inductor until the point in time at which the power switch 227 is turned off. At that time the inductor gives up its energy and the current decreases as it gives up its energy to the filter capacitor 101 and load combination 69. circulating through the catch diode 60. The waveform of FIG. 9J similarly represents the current through the second series inductor 95 and again is 180° out of phase from the current through the series inductor 75. The waveform of FIG. 9K represents the current through the summing node 59 and is a simple current addition of the current flowing through the series inductor 75 added to the current flowing through the series inductor 95. It will be noted that the current never reaches zero but alternates above and below some non-zero level of current midway between the peaks and valleys of the waveform of FIG. 9K. The waveform of FIG. 9L represents the voltage at the summing node 59 and again, the voltage never reaches zero but alternates slightly back and forth between some intermediate average value which would be approximately +12 volts and the waveform of FIG. 9M represents the regulated voltage $V_{OUT}$ which, in the present case, would be at a constant regulated +12 volt DC as would appear between output terminals 267 and 267' after being filtered by the output filter of block 261.

Figure 10:
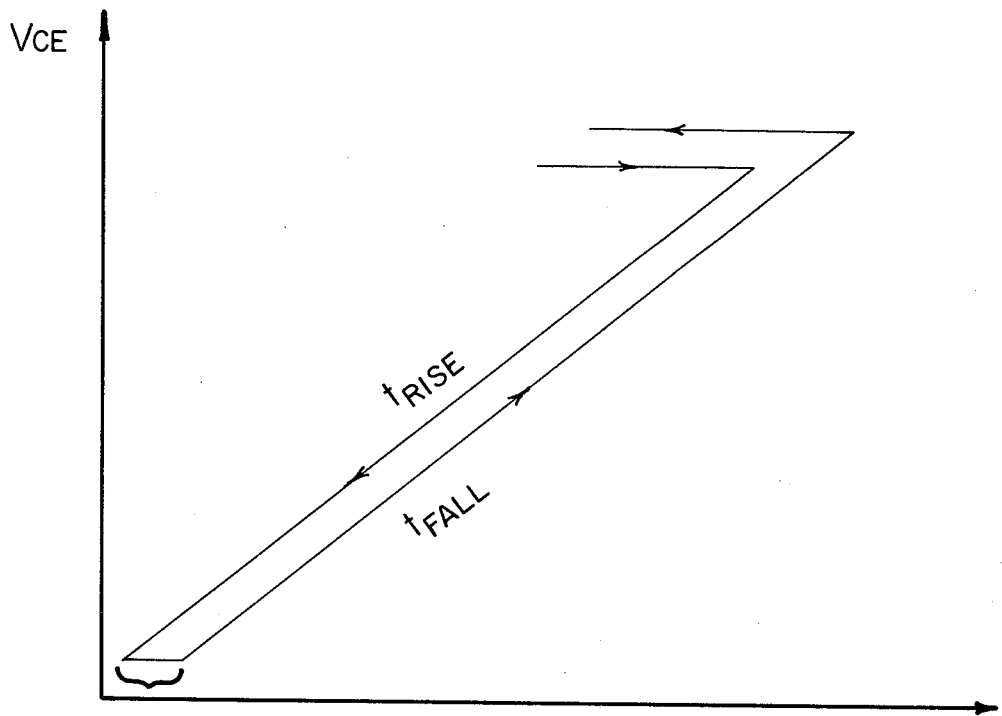
FIG. 10 is a illustration of $V_{CE}$ vs. the power dissipated in the switch $P_{DISS}$ for prior art switching regulators.
Figure 11:
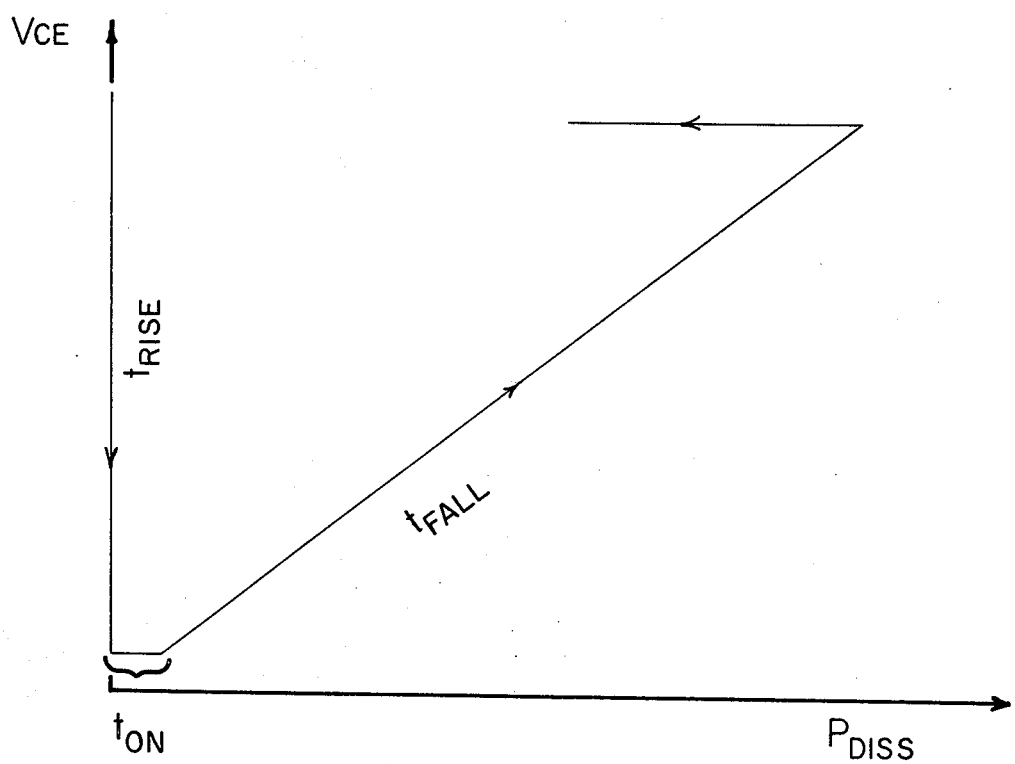
FIG. 11 is an illustration of $V_{CE}$ vs. the power dissipated in the switch $P_{DISS}$ for the high efficiency switching regulator of the present invention.

FIGS. 10 and 11 are included to show the increased efficiency of the switching regulator of the present invention. FIG. 10 shows a plot of $V_{CE}$ vs. the power dissipated $P_{DISS}$ in the switch for a typical prior art switching regulator. It will be observed that when the switch is initially driven on, the entire $V_{CC}$ input voltage of +24 volts, for example, will be applied across the transistor switch and if, as is the case with most of the switching regulators of the prior art, the series inductor is presently conducting nearly the normal load current of say, for example, 6 amps, or slightly thereunder, we have an initial power dissipation of 24 volts times 6 amps or 144 watts. It will be seen that during the rise time, the power dissipated will gradually fall, but the sum total of the power dissipated during turn-on is considerable, and indeed may amount to nearly half of the total switching loss. A rather insignificant portion is lost in the switch during the actual switch-on time as indicated by the interval labeled $t_{on}$ since very low voltage is dropped across the switch after it has saturated. When the switch is turned off, considerable power is again dissipated in the switch during the fall time as indicated in the waveform of FIG. 10.

The improved efficiency, high reliability switching regulator of the present invention eliminates nearly 100% of the power dissipation normally associated with switch turn-on as illustrated in FIG. 11. This is accomplished by insuring that the switch is always turned on only into a non-conducting series inductor and a fully recovered catch diode. This insures that there is virtually no power dissipated in the switch until it is fully saturated and then the normal on time loss occurs which remains about the same as in the prior art and the power dissipation associated with switch turn off during the fall time remains about the same as well. The improved efficiency of the present invention is therefore attributable to the fact that we eliminate the power dissipation normally associated with switch turn-on, which amounts to nearly 50% of all switching losses.

Figure 12:
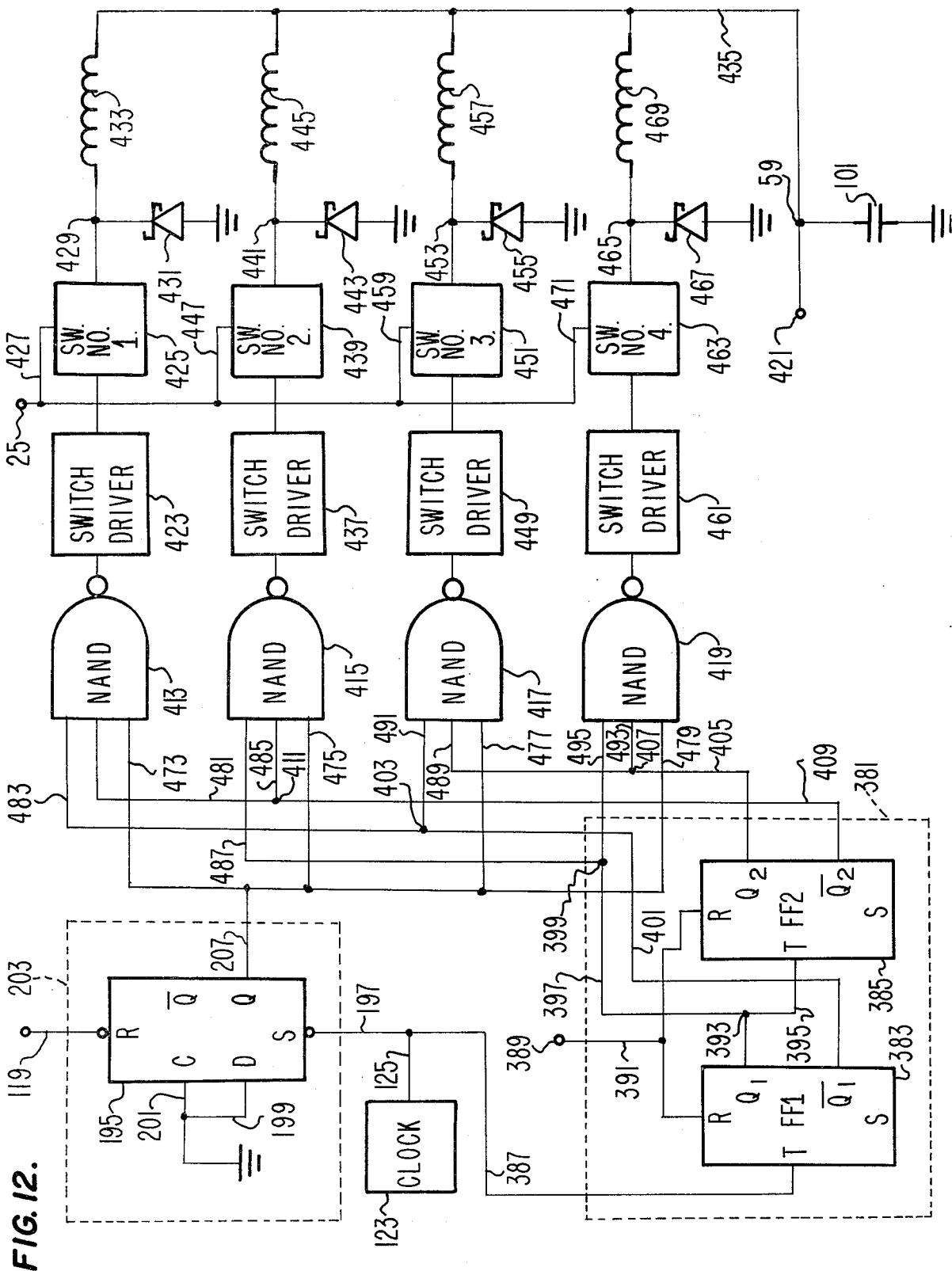
FIG. 12 is a block-schematic diagram of an alternate embodiment of the improved switching regulator of the present invention illustrating the use of more than two series switching regulator paths.

The block diagram-schematic of FIG. 12 illustrates an alternate embodiment wherein "N" (here N=4) separate series regulator switching paths are connected in parallel but the operation of the circuit remains generally the same as that previously described. It is an important aspect of the present invention that more than two parallel switching paths may be employed. This is important since cases may arise wherein a second path could be enabled before its series inductor has had a chance to fully discharge its energy and before its catch diode is fully recovered. By adding additional series paths in parallel with one another, this problem can be eliminated and the invention will be usuable at any switching speed.

The clock or oscillator which is represented by block 123 may be the same as the clock circuit of the dotted block 123 of FIG. 6, or may be any type of clock known in the art which generates narrow-width clock pulses. The output of the clock is taken from lead 125 and is supplied to the set input of a D type flip-flop 195 which is configured as a latch and is shown as being employed within the dotted block 203. This latch may be identical to the latch of FIG. 6. The D and C inputs are connected directly to ground via leads 199 and 201 respectively so as to allow the D type flip-flop 195 to operate as a latch. The reset or R input is connected to lead 119 as described previously and receives the error signals from the error summing node 113 for controlling the pulse width of the Q output of the latching flip-flop 195.

Since N=4 for the embodiment of the FIG. 12, four separate series switching regulator paths are coupled in parallel in the circuit of FIG. 12 rather than two. The divide-by-two counter of block 179 of FIG. 6 has been replaced by the N-counter of dotted usable 381 of FIG. 12. Since N=4, the 4-counter includes a first RST flip-flop 383 and a second RST flip-flop 385. The "T" or toggle input of the first RST flip-flop 383 is connected to the clock lead 125 via lead 387. The R reset input of flip-flop 383 and flip-flop 385 are coupled to a reset terminal 389 via lead 391 and a signal may be applied to initially clear the flip-flops at the start of operation, as known in the art. The "Q1" output node 393 is connected to the T or toggle input of the second RST flip-flop 385 via lead 395 and is further connected via lead 397 to a node 399. The "$\overline{Q1}$" output of the first RST flip-flop 383 is connected via lead 401 to a node 403. The "Q2" output of the second RST flip-flop 385 is connected via lead 405 to a node 407 and the "$\overline{Q2}$" output is connected via lead 409 to a node 411. The output nodes 399, 403, 407 and 411 receive the Q1, $\overline{Q1}$, Q2, and $\overline{Q2}$ outputs of the RST counter flip-flops 383 and 385 respectively and are used to obtain a continuous four count; 00, 01, 10, 11, and back to 00 to begin again. The count is used to sequentially enable first, second, third and fourth NAND gates 413, 415, 417, and 419 respectively. These NAND gates may be identical to the NAND gates of FIG. 6 and serve an identical function. Each NAND gate being the input to its respective series switching regulator path comprising a switch driver, a power switch, a catch diode, and a series inductor. The four series switching paths are then connected to a common summing node 59 which is coupled to the positive plate of a filter capacitor 101 whose opposite plate is grounded, and the summing node 59 may be connected via lead 421 to the current limiting circuit of block 103 of FIG. 8 and to the voltage error detector circuit of dotted block 107 of FIG. 8, as previously described. The first series switching regulator path comprises a first NAND gate 413 whose output is connected to a switch driver 423 which may be, for example, similar to the driver circuit within dotted block 213 of the circuit of FIG. 7 and its output may be used to drive a first power switch 425 which may be similar to the hybrid Darlington powder switch of dotted block 227 of FIG. 7. The first power switch 425 has a switch input connected to an unregulated voltage input supply terminal 25 to receive the unregulated voltage $V_{IN}$ via lead 427. The output of the first power switch 425 is connected to the first series node 429, and the first series node 429 is connected to the cathode of a Schottky diode 431 whose anode is connected to ground. The Schottky diode 431 serves as a free-wheeling or catch diode, as known in the art. Node 429 is coupled to one end of a first choke coil or series inductor 433 whose opposite end is commonly coupled to the summing node 59 via lead 435. While the first series regulator switching path has been defined as comprising NAND gate 413, a first switch driver 423, a first power switch 425, a first catch diode 431 and a first series inductor 433, it will be realized by those skilled in the art that the actual series switching paths which are connected in parallel actually originate at the unregulated $V_{IN}$ supply terminal 25 and extend through the power switching element 425 and the series inductor 433, to terminate at the common summing node 59.

The second series switching regulator path comprises a second NAND gate 415 whose output is connected to a second switch driver circuit 437 whose output is used to drive a second power switch 439 whose output is connected to a second series node 441. The second series node 441 is similarly connected to the cathode of a Schottky diode 443 whose anode is connected to ground and the node 441 is further connected to one end of a second series inductor 445 whose opposite end is connected to the summing node 59 through lead 435. Again, the input of the power switch is connected to the unregulated input supply terminal 25 via lead 447. A third series regulator switching path comprises a third NAND gate 417 whose output is connected to a third switch driver circuit 449 whose output is used to drive a third power switch 451 whose output is connected to a third series node 453. The third series node 453 is connected to the cathod of a Schottky catch diode 455 whose anode is connected to ground and to the input of a third series inductor 457 whose output is connected via lead 435 to the common summing node 59. The input to the power switch 451 is connected to the unregulated $V_{IN}$ terminal 25 via lead 459. The fourth series switching regulator path comprises a fourth NAND gate 419 whose output is connected to the input of a fourth switch driver circuit 461 whose output is used to drive a fourth power switch 463 whose output is connected to a fourth series node 465. The fourth series node 465 is coupled to the cathode of a fourth Schottky catch diode 467 whose anode is connected to ground and to the input of a fourth series inductor 469 whose output is coupled via lead 435 to the common summing node 59. The power switch 463 input is connected via lead 471 to the unregulated $V_{IN}$ terminal 25. Each of the switch drivers 423, 437, 449 and 461 are similar to those of dotted block 213 of FIG. 7 and operate in a similar manner and the power switches of blocks 425, 439, 451 and 463 are similar to the hybrid Darlington power switches of block 227 of FIG. 7 and operate in an identical manner. The Schottky diodes 431, 443, 455, and 467 operate as catch diodes or free-wheeling diodes in an identical manner as do the Schottky diodes 69 and 89 of the circuit of FIG. 8, and the series inductors 433, 445, 457 and 469 function identically to the series inductor 75 and 95 of the circuit of FIG. 8. Summing node 59 would be connected to the current-limiting circuit of dotted block 103 of FIG. 8 and thence to the output filter of dotted block 231 and to the voltage error detecting circuit of block 107, having a reference input as indicated by the dotted block 111 of FIG. 8. The error summing node would similarly send back voltage error signals and over-current override reset signals to the reset input of a latch 195 as indicated by block 203 of FIG. 12. The 4-counter of block 381 will operate to address or sequentially select the first, second, third and fourth NAND gates 413, 415, 417 and 419 respectively, as described hereinafter. As each count 00, 01, 10 and 11 sequentially enable one after the other of these NAND gates, the output of the NAND gate will be caused to go low in accordance with the pulse-width modulated output of the latch 195 which is supplied thereto from the latch output lead 207.

The output of latch 195 is taken via lead 207 and supplied to node 205 and thence to the first input of the first NAND gate 413 via lead 473; to the first input of a second NAND gate 415 via lead 475; to the first input of a third NAND gate 417 via lead 477; and to the first input of a fourth NAND gate 419 via lead 479. These first inputs supply the pulse-width modulating output signal to the NAND gates from the latch 195 as described previously with reference to FIG. 6.

The second input of the first NAND gate 413 is connected to the $\overline{Q}_2$ node 411 via lead 481 and the third input to the first NAND gate 413 is connected to the $\overline{Q}_1$ node 403 via lead 483 so that when the 4-counter of block 381 counts 00 at the Q outputs, the $\overline{Q}_1$ and $\overline{Q}_2$ outputs will enable the first NAND gate 413 on this first count. The second input to the second NAND gate 415 is connected to the $\overline{Q}_2$ node 411 via lead 485 and the third input to the second NAND gate 415 is connected to the $Q_1$ node 399 via lead 487. This enables this second NAND gate 415 to be enabled on the second or 01 count since, at that count, the $Q_1$ and $\overline{Q}_2$ signals will both be high thereby enabling the second NAND gate 415 on the second count. The second input to the third NAND gate 417 is taken from the $Q_2$ node 407 via lead 489 and the third input to the third NAND gate 417 is taken from the $\overline{Q}_1$ node 403 via lead 491. This connection will enable the third NAND gate to be enabled on the third count of 10 since, at this time, the $\overline{Q}_1$ and the $Q_2$ signals will both be high so as to enable the NAND gate 417. The second input to the fourth NAND gate 419 is taken from the $Q_2$ node 407 via lead 493 and the third input to the fourth NAND gate 419 is taken from the $Q_1$ node 399 via lead 495. This connection enables the fourth NAND gate 419 to be enabled on the fourth count of 11 since, at this time, both $Q_1$ and $Q_2$ will be high.

In operation then, we see that the 4-counter of block 381 will sequentially address or select the first, second, third and fourth NAND gates 413, 415, 417 and 419 respectively and they in turn will cause the corresponding switch drivers 423, 437, 449 or 461 to turn on the corresponding power switch 425, 439, 451 and 463 sequentially for the period of time dictated by the pulse-width modulated output of the latch 195 which controls the period during which the selected NAND gate enables the driving of the power switching elements. The summing junction 59 will sum the outputs, as was explained with reference to the waveform diagram of FIG. 9, with the exception that four rather than two sets of waveforms will be summed, but the essential operation of the circuit remains the same as previously described. It will be perfectly obvious to those skilled in the art that any number $N(N>1)$ of series switching regulator paths may be employed.

Table I below illustrates representative component values used in a typical embodiment of the present invention as described with reference to FIGS. 5–8. These values are meant to be representative only and in no way constitute any limitation upon the present invention.

TABLE I

| Component | Ref. No. | Value or Designation |
| --- | --- | --- |
| Delay Multivibrator | 131 | Std. 9602 DMV |
| Comparators | 273,315 | Std. 311 Differential voltage comparators. |
| Regulator | 369 | Std. 723 Voltage regulator. |
| "D" Flip-Flops | 177,195 | "D" type 7474 flip-flops. |
| NAND gates | 183,193 | Std. 944 NAND gates. |
| Inverters | 151,171 | Std. 936 Inverters. |
| Resistors | 137 | 15000 Ohms. |
| Resistors | 219,219', 220,220'. | 1500 Ohms. |
| Resistors | 223,223' | 470 Ohms. |
| Resistors | 239,239' | 47 Ohms. |
| Resistors | 245,245' | 20 Ohms. |
| Resistors | 255 | .015 Ohms. |
| Resistors | 285,289 | 383 Ohms. |
| Resistors | 297 | 560 Ohms. |
| Resistors | 299 | 51,100 Ohms. |
| Resistors | 311 | 1×10 Ohms. |
| Resistors | 325 | 2870 Ohms. |
| Resistors | 331 | 4870 Ohms. |
| Resistors | 343 | 6700 Ohms. |
| Resistors | 363 | 1000 Ohms. |
| Capacitors | 101 | 1800 Microfarads. |
| Capacitors | 147,367 | 100 Microfarads. |
| Capacitors | 157,283,313, 329,345,355. | .1 Microfarads. |
| Capacitors | 373 | 6.8 Microfarads. |
| Inductors | 75,95 | 18 Microhenries. |
| Inductors | 263 | 100 Microhenries. |
| Schottky diodes | 69,89 | SD51 Schottky Diodes. |
| Zener Diode | 271 | 15 Volt Zener Diode. |
| Diodes | 221,221' | 1N4154 |

Although specific apparatus has been shown for the purpose of describing applicants' invention, it will be apparent to those skilled in the art that other variations and modifications in the specific structure illustrated may be made without departing from the spirit and scope of the present invention which is limited only by the appended claims.

We claim:

1. A switching regulator for receiving an unregulated input voltage and supplying a regulated DC voltage to its output, said switching regulator comprising:
   a first series switching path including a first series power switching means, a first series inductor means, and a first catch diode means;
   a second series switching path including a second series power switching means, a second series inductor means, and a second catch diode means;
   means for coupling said unregulated input voltage to said first and second series power switching means;
   means for summing the outputs of said first and second series inductor means and supplying said regulated DC voltage to said regulator output;
   means responsive to said regulated DC output voltage for generating an error signal when said output voltage falls below a predetermined desired level;
   means for alternately selecting one of said first and second series power switching means; and
   means for supplying drive current to the selected one of said first and second series power switching means and for sustaining said drive current for the duration of said error signal.

2. The switching regulator of claim 1 wherein said first series switching path includes a first series power switching means having a switch input, a switch output, and a switch control electrode, wherein said switch input is coupled to said source of unregulated input voltage, wherein said switch output is coupled to the input of said first series inductor means, wherein the output of said first series inductor means is coupled to said summing means, and wherein said first catch diode means includes a diode having its cathode coupled to the input of said first series inductor means and its anode coupled to ground; and wherein said second series switching path includes a second series power switching means having a switch input, a switch output, and a switch control electrode, wherein said switch input is coupled to said source of unregulated input voltage, wherein said switch output is coupled to the input of said second series inductor means, wherein the output of said second series inductor means is coupled to said summing means and wherein said second catch diode means includes a diode having its cathode coupled to the input of said second series inductor means and its anode coupled to ground.

3. The switching regulator of claim 2 wherein said first and second catch diodes comprise high-current high-temperature Schottky power diodes having fast recovery times.

4. The switching regulator of claim 1 wherein said first and second series power switching means includes a modified hybrid Darlington power switch comprising:

an NPN power transistor having its collector coupled to the input of said series power switching means and its emitter coupled to the output of said series power switching means;

a PNP power transistor having its collector coupled to the base of said NPN power transistor, its emitter directly coupled to the input of said series power switching means and its base connected to said means for supplying drive current;

first resistive means for coupling the base of said PNP power transistor to its emitter; and second resistive means for coupling the junction of the collector of said PNP power transistor and the base of said NPN power transistor to the output of said series power switching means.

5. The switching regulator of claim 1 wherein said summing means includes:

means for establishing a common summing node;

means for coupling the output of said first and second series inductor means to said common summing node;

means for coupling said summing node to the output of said switching regulator; and filter capacitor means for capacitively coupling said summing node to ground.

6. The switching regulator of claim 1 wherein said means for generating an error signal comprises:

a first differential voltage comparator means having a first comparator input, a second comparator input, and a comparator output;

means for supplying a source of reference potential to the first input of said differential voltage comparator means;

means coupled to said summing means for sensing a signal representative of the voltage at the output of said switching regulator and for supplying said representative voltage to the second input of said differential voltage comparator means such that when the regulated DC voltage at the output of the switching regulator falls to a value below a predetermined desired value of regulated DC output voltage, said differential voltage comparator means will generate a voltage error signal at its output until the voltage at the output of said switching regulator has been restored to said predetermined desired level.

7. The switching regulator of claim 6 wherein said means for generating an error signal further includes an over-current sensing means responsive to an over-current condition for overriding said error signal and terminating said supply of drive current, said over-current sensing means comprising:

a second differential voltage comparator means having a first and second comparator input and a comparator output;

a current-sensing resistor means coupled between said summing means and the output of said switching regulator for sensing the current passing therethrough;

first resistor-capacitor means for coupling said summing means and one end of said current-sensing resistor means to the first input of said differential voltage comparator means;

second resistor-capacitor means for coupling the opposite end of said current-sensing resistor means to the second input of said differential voltage comparator means for establishing a differential voltage ratio between the first and second inputs of said differential voltage comparator means such that the existence of an over-current condition through said current-sensing resistor means will be indicated by the existence of a predetermined differential voltage ratio between the first and second inputs of said differential voltage comparator means so as to cause the output of said differential voltage comparator means to switch from a normal state of an over-current override error state; and means for coupling the output of said second differential voltage comparator means to the output of said first differential voltage comparator means such that the presence of said over-current override error signal from the output of said second differential voltage comparator means will override said voltage error signal and cause the termination of drive current to said series power switching means.

8. The switching regulator of claim 1 wherein said means for alternately selecting one of said first and second series power switching means comprises:

a source of fixed-frequency narrow-width clock pulses;

counter means responsive to said narrow-width clock pulses for complementing its output with the occurrence of each successive clock pulse; and means for coupling the output of said counter means to said drive current supplying means for selectively enabling said first series power switching means when a first counter output is present and for selectively enabling said second series power switching means when the output of said counter means is complemented.

9. The switching regulator of claim 8 wherein said means for supplying drive current to a selectively enabled one of said first and second series power switching means and for sustaining said drive current for the duration of said error signal comprises:

a first driver means responsive to the presence of a first gated drive control signal for supplying drive current to said first series power switching means and responsive to the absence of said first gated drive control signal for terminating the supply of said drive current to said firsst series power switching means;

second driver means responsive to the presence of a second gated drive control signal for supplying drive current to said second series power switching means and responsive to the absence of said second gated drive control signal for terminating the supply of said drive current to said second series power switching means;

first gating means for gating said first gated drive control signal to said first driver means;

second gating means for gating said second gated drive control signal to said second driver means;

means for coupling the output of said counter means to said first and second gating means for selectively enabling said first gating means upon the first output of said counter means and for selectively enabling the second gating means when the output of said counter means is complemented; and latching means responsive to the narrow-width clock pulses for initially setting the latching means and supplying a drive initiation signal to said gating means so as to cause the selectively enabled gating means to pass said gated drive control signal to said drive means and means for normally resetting said latching means at the termination of said clock pulse; for resetting said latching means when said voltage error signal is present at the termination of said voltage signal for effecting pulse width modulation; and for resetting said latching means regardless of the presence or absence of said voltage error signal when an over-current condition exists.

10. The switching regulator of claim 9 wherein said means for generating an error signal comprises:

voltage error sensing means coupled to said summing means for sensing when the output of said switching regulator has fallen below a predetermined desired level for generating said voltage error signal and delaying the resetting of said latching until the termination of said voltage error signal thereby insuring that said selected driver means continues to supply drive current to its corresponding selected series power switching means for the duration of said voltage error signal or until said counter means is complemented; and over-current sensing means coupled between said summing means and the output of said switching regulator for sensing the occurrence of an over-current condition and for generating an over-current condition signal for overriding the presence of said voltage error signal and immediately resetting said latching means to terminate the supply of drive current to the selected series power switching means.

11. In a regulated power supply including means for transforming a first level of AC input signal into a second level of AC input signal; means for rectifying said second level of AC input signal; means for filtering the output of said rectifier means; and an improved switching regulator means for receiving the output of the DC filter means and providing a regulated DC output voltage, said improved switching regulator comprising:

a plurality of N series switching paths, each of which includes a power transistor switching means, a catch diode means, and a choke coil means, each of said plurality of N series switching paths terminating in a common summing node and being connected in parallel between the output of said filtering means and said common summing node;

filter capacitor means coupled between said common summing node and ground;

means coupled to said common summing node for outputting said regulated DC output voltage;

means coupled to said common summing node for sensing voltage output errors and for generating a control signal in response thereto;

a plurality of N independent drive means each of which is associated with a corresponding one of said plurality of N series power transistor switching means for turning said series transistor power switching means on and off;

counter means for sequentially enabling individual ones of said plurality of N drive means; and pulse-width modulator means having its output coupled to each of said plurality of N drive means, said pulse-width modulator means being responsive to said error signal for varying the width of the output pulse supplied to each of said plurality of N drive means such that the enabled one of said drive means will supply drive current to its respective series power transistor switching means for the duration of said modulated output pulse.

12. The improved regulated power supply of claim 11 wherein each of said plurality of N independent drive means each of which is associated with a corresponding one of said plurality of N series power transistor switching means comprises:

a gating means including a first input means responsive to a unique count from the output of said counter means for enabling said similarly numbered gating means, a second input means for receiving the modulated output pulse from said pulse-width modulator means, and a gating output for gating a drive control signal when said gating means is enabled and for terminating said gated drive control signal upon the termination of said modulated output pulse; and a transistor driver means responsive to said gated drive control signal for supplying base drive current to its associated power transistor switching means until said gated drive control signal is terminated.

13. The regulated power supply of claim 12 wherein said counter means comprises:

a source of fixed-frequency narrow-width clock pulses;

means for sequentially counting N of said clock pulses and for generating N unique counter outputs, each of said N unique counter outputs being supplied to a corresponding one of said N drive means for enabling the correspondingly numbered one of said plurality of N gating means.

14. The improved regulated power supply of claim 12 wherein;

said means coupled to said common summing node for outputting said regulated DC output voltage includes an over-current sensing means for sensing an over-current condition and for generating an over-current override signal in response thereto;

said means coupled to said common summing node for sensing voltage output errors and for generating a control signal in response thereto includes a differential voltage comparator means responsive to said voltage output errors for generating a control signal which persists until the voltage output error condition ceases to exist; and said pulse-width modulator means for supplying said modulated output pulse to each of said plurality of N gating means includes:

latching means including means for initially setting said latching means at the start of each clock period for initiating the generation of said modulated output pulse;

means for normally resetting said latching means and terminating the duration of said modulated output pulse at the end of said clock pulse when no control signal representative of a voltage output error exists, for delaying the resetting of said latching means so long as said control signal persists and no over-current override signal is present, and for immediately resetting said latching means and terminating said modulated output pulse regardless of the presence of said control signal whenever said over-current override signal is generated.

15. The improved regulated power supply of claim 14 wherein said over-current sensing means comprises:

a current-sensing resistor means coupled between said common summing node and said output of regulated DC voltage for sensing the existence of an over-current condition;

a first differential voltage comparator means having first and second inputs and a comparator output;

a first resistor-capacitor means coupled betwen said summing node and the first input of said first differential voltage comparator means;

a second resistor-capacitor means coupled between the opposite end of said current-sensing resistor means and the second input of said first differential voltage comparator means for establishing a differential voltage ratio between the first and second inputs of said first differential voltage comparator means such that the differential voltage ratio which is established between said first and second inputs exceeds a predetermined ratio whenever an over-current condition exists for causing said first differential voltage comparator to output said over-current override signal for immediately resetting said latching means and terminating the supply of drive current to said power transistor switching means regardless of the presence or absence of said control signal.

16. The improved regulated power supply of claim 14 wherein the differential voltage comparator means of said means for generating a control signal comprises:

a second differential voltage comparator means having a first and second input and a comparator output;

a source of reference potential indicative of the predetermined desired level of regulated output voltage;

first resistor-capacitor means for coupling said source of reference potential to the first input of said second differential voltage comparator means;

second resistor-capacitor means for coupling said common summing node to the second input of said second differential voltage comparator means for establishing a differential voltage ratio between said first and second inputs such that said voltage error control signal will be generated at said comparator output when the regulated output voltage falls below said predetermined desired level of voltage, said voltage error control signal enabling said latching means to remain set until the voltage error condition ceases.

17. The improved regulated power supply of claim 11 wherein each of said power transistor switching means includes a switch input coupled to the output of said filtering means, a switch output coupled to one end of a corresponding choke coil means, and a control electrode coupled to the output of a corresponding one of said drive means for turning said power transistor switching means on and off; said catch diode means comprising a power diode having its cathode coupled to said one end of said choke coil means and its anode coupled to ground; and said choke coil means comprising a series inductor having its opposite end connected to said commonly coupled summing node.

18. The improved regulated power supply of claim 17 wherein said power transistor switching means comprises a hybrid Darlington power switch including a first PNP power transistor having its collector coupled to said switch input and its emitter coupled to said switch output, a second PNP power transistor having its collector coupled to the base of said first NPN power transistor, its emitter coupled directly to said switch input, and its base serving as a control electrode and being coupled to the output of the one of said drive means associated therewith, a first resistive means coupling the emitter of said PNP power transistor to its base, and a second resistor means coupling the junction of the base of said first NPN power transistor and the collector of said second PNP power transistor to said switch output.

19. An improved method of switching regulation comprising the steps of:

providing at least a first and a second series switching path, each of said paths including a power switching means, a catch diode means, and a series inductor;

summing the outputs of said plurality of series switching paths at a filter capacitor to supply a regulated DC voltage output to a load;

sensing differences between the summed voltage and a predetermined desired level of output voltage for generating an error signal;

sequentially selecting different ones of said series power switching means; and controlling the on and off time of said selected series power switching means in accordance with the duration of said error signal.

20. The improved method of switching regulation of claim 19 wherein said step of controlling the on and off time of said selected series power switching means in accordance with the duration of said error signal further comprises the steps of:

generating a series of fixed frequency clock pulses;

initiating a supply of drive current to said selected series power switching means at the beginning of each clock cycle;

normally terminating the supply of drive current to said selected series power switching means before said switching means has had sufficient drive current to initiate turn-on provided no error signal has been generated;

enabling the continued supply of drive current to said selected series power switching means for the duration of said generated error signal; and sensing the existence of an over-current condition for generating an error signal override signal for immediately terminating the supply of drive current to said selected series power switching means when an over-current condition has occurred.

21. In a switching regulator for regulating a DC output voltage by varying the duty cycle of a power transistor switch by the use of pulse-width modulation techniques, the improvement comprising:
a plurality of individual series switching paths each of which includes a power-transistor switch;
means for coupling said plurality of switching paths between a source of unregulated voltage and a regulated voltage output; and
means for sequentially addressing different ones of said power-transistor switches for controlling the duty cycle thereof to insure that said regulated DC output voltage remains constant.

22. In a switching regulator system wherein constant regulated DC output voltage is provided by regulating the duty cycle of a power transistor switching means in accordance with a feed-back signal indicative of a voltage error at the output of the switching regulator, an improvement comprising:
N switching paths coupled between a source of unregulated input voltage and the regulated output of said switching regulator system, each of said N series switching paths including a power transistor switching means, a series inductor, and a catch diode;
an N-counter means for sequentially generating N unique counts, each of said N unique counts being used to address a unique one of said N power transistor switching means; and
means responsive to a voltage error at the output of said switching regulator system for controlling the on and off time of said addressed power transistor switching means for restoring the regulated DC output voltage to its desired level.

* * * * *